United States Patent
Mehrnia et al.

(10) Patent No.: US 6,839,389 B2
(45) Date of Patent: Jan. 4, 2005

(54) DIGITAL QUADRATURE DEMODULATION AND DECIMATION WITHOUT MULTIPLIERS

(75) Inventors: Alireza Mehrnia, Los Angeles, CA (US); Kaveh Shakeri, Atlanta, GA (US)

(73) Assignee: PRI Research & Development Corp., Torrance, CA (US)

(*) Notice: Subject to any disclaimer, the term of this patent is extended or adjusted under 35 U.S.C. 154(b) by 722 days.

(21) Appl. No.: 09/805,530

(22) Filed: Mar. 13, 2001

(65) Prior Publication Data

US 2002/0025006 A1 Feb. 28, 2002

Related U.S. Application Data

(60) Provisional application No. 60/188,883, filed on Mar. 13, 2000.

(51) Int. Cl.[7] .............................................. H04L 27/16
(52) U.S. Cl. .................... 375/328; 375/340; 329/305; 329/310; 329/364
(58) Field of Search ........................... 375/260, 324, 375/328, 340, 351; 329/304, 305, 310, 363, 364

(56) References Cited

U.S. PATENT DOCUMENTS

| | | | | |
|---|---|---|---|---|
| 5,422,909 A | * | 6/1995 | Love et al. | 375/147 |
| 5,881,107 A | * | 3/1999 | Termerinac et al. | 375/279 |
| 6,282,248 B1 | * | 8/2001 | Farrow et al. | 375/324 |

* cited by examiner

*Primary Examiner*—Dac V. Ha
(74) *Attorney, Agent, or Firm*—Blakely, Sokoloff, Taylor & Zafman

(57) ABSTRACT

One embodiment of the present invention includes a gating circuit, a demultiplexer, and an integrator. The gating circuit gates an input sample with a first clock, the input sample being clocked by a sampling clock N times faster than the first clock. The demultiplexer demultiplexes the gated input sample to generate in-phase and quadrature samples. The integrator integrates the in-phase and quadrature samples to generate in-phase and quadrature decimated samples corresponding to the in-phase and quadrature samples, respectively. Each of the in-phase and quadrature decimated samples having K bits.

30 Claims, 17 Drawing Sheets

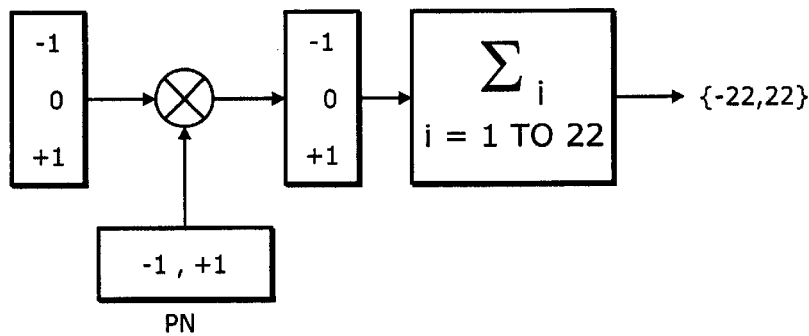
*FIG. 7A*
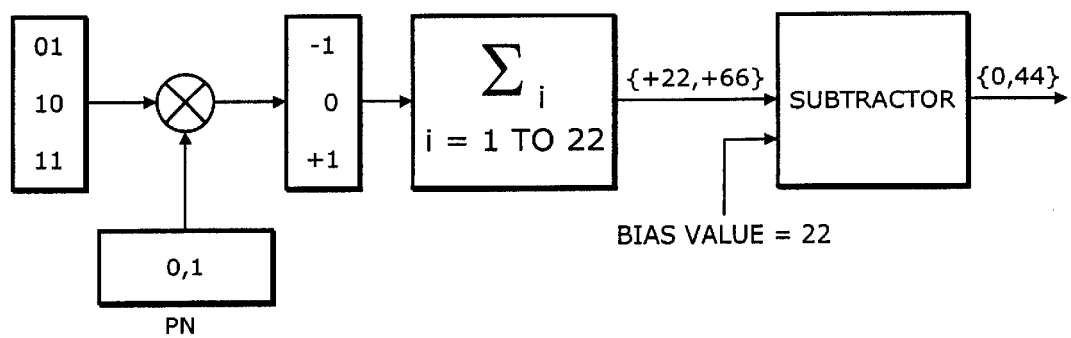
*FIG. 7B*
|  | PN CODE | |
|---|---|---|
|  | 0 | 1 |
| 01 | 01 | 11 |
| 10 | 10 | 10 |
| 11 | 11 | 01 |
DATA SAMPLES
*FIG. 7C*

US 6,839,389 B2

DIGITAL QUADRATURE DEMODULATION AND DECIMATION WITHOUT MULTIPLIERS

RELATED APPLICATION

This application claims the benefit of U.S. Provisional Application No. 60/188,883, titled "Low Power Spread-Spectrum Receiver Architecture" filed on Mar. 13, 2000.

BACKGROUND

1. Field of the Invention

This invention relates to digital communication. In particular, the invention relates to global positioning system (GPS).

2. Description of Related Art

Global positioning system (GPS) has provided many useful civilian applications such as in-car navigation systems, automatic position reporting during emergency, low-visibility harbor operations, navigation systems for hikers, campers, and other recreational users.

Existing techniques for designing GPS receivers have a number of drawbacks. First, the re-tracking circuit is either complex requiring significant amount of hardware, or slow resulting in poor performance. Second, power consumption is high and therefore the receiver is not suitable for low power applications. Third, the architecture may be difficult to interface to programmable processors.

Therefore, there is a need to have an efficient architecture for GPS receivers to process GPS signals efficiently without incurring large power consumption.

BRIEF DESCRIPTION OF THE DRAWINGS

The features and advantages of the present invention will become apparent from the following detailed description of the present invention in which:

FIG. 7A is a diagram illustrating a range of correlation result using the actual ranges according to one embodiment of the invention.

FIG. 7B is a diagram illustrating a range of correlation result using the represented ranges according to one embodiment of the invention.

FIG. 7C is a diagram illustrating a mapping of the correlation result according to one embodiment of the invention.

DESCRIPTION

Figure 1:
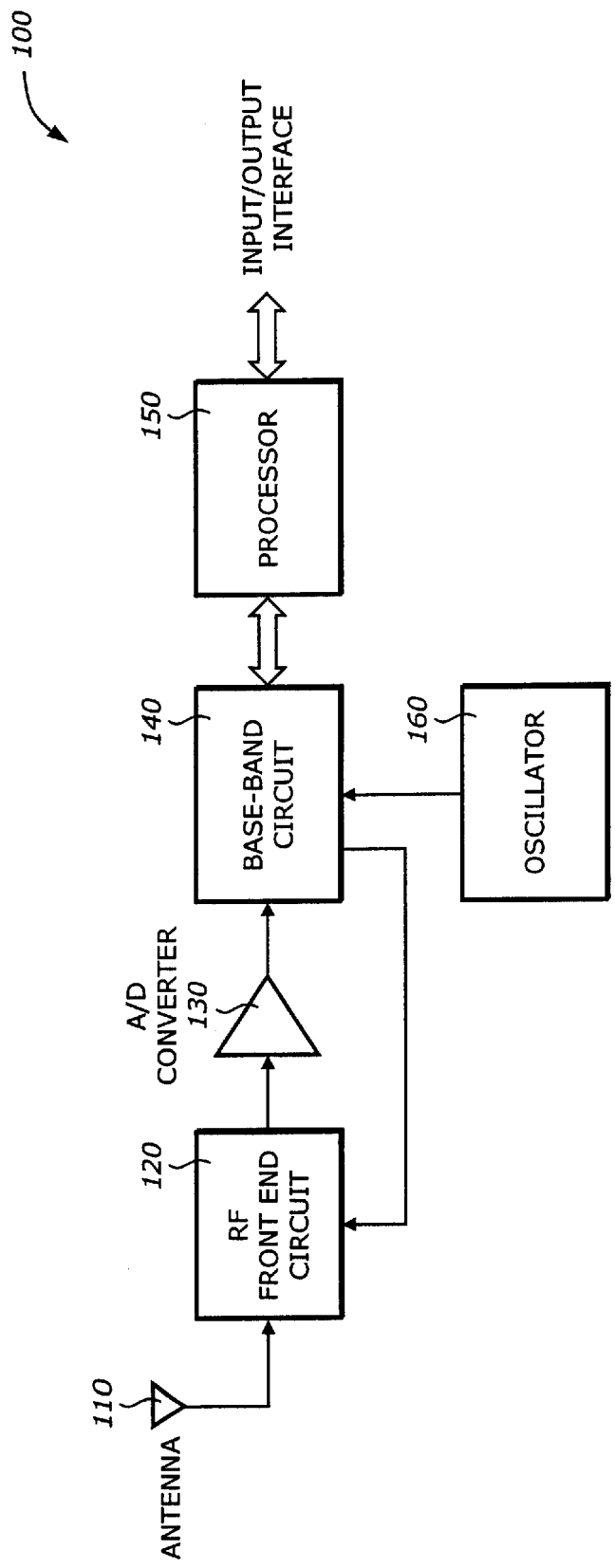
FIG. 1 is a diagram illustrating a system in which one embodiment of the invention can be practiced.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

One embodiment of the present invention includes a gating circuit, a demultiplexer, and an integrator. The gating circuit gates an input sample with a first clock, the input sample being clocked by a sampling clock N times faster than the first clock. The demultiplexer demultiplexes the gated input sample to generate in-phase and quadrature samples. The integrator integrates the in-phase and quadrature samples to generate in-phase and quadrature decimated samples corresponding to the in-phase and quadrature samples, respectively. Each of the in-phase and quadrature decimated samples having K bits.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

The A/D converter 130 converts the analog signal from the RF front end circuit 120 into digital data for digital processing in subsequent stages. The A/D converter 130 operates with a sampling frequency at $16*f_0$. The sampling frequency is selected to provide adequate anti-aliasing without incurring complexity and costs to the system 100. A sample-and-hold device (not shown) may be used to hold the analog signal during the A/D conversion. The sample-and-hold device acts like a sampler operating at the sampling frequency. The word length of the A/D converter 130 depends on the characteristics of the signal and the requirements of the system. In one embodiment, the A/D converter 130 has a word size of one bit. When the A/D converter 130 has a word size of one bit, it can be implemented as a hard limiter using an operational amplifier as a comparator. The output of the comparator is one of two logic levels depending on whether the analog sample is greater or below a predetermined threshold value. The comparator output is the digitized input sample and is latched into a flip-flop clocked at a sampling clock signal. In one embodiment, this sampling clock signal is sixteen times the nominal frequency $f_0$ of 1.023 MHz. The digitized input samples are then fed to the base-band circuit 140 for base-band processing.

The base-band circuit 140 is the main section to process the digitized signal, or samples, to provide correlation results to the processor 150. The base-band circuit 140 uses a multi-channel multiplexing scheme and a spread spectrum architecture. The base-band circuit 140 has a number of novel features to be described later. These features include efficient processing, simple implementation, and low power. The base-band circuit 140 processes the input signal from a number of satellites in the GPS. In one embodiment, the number of satellites is twelve. The base-band circuit 140 employs a parallel mechanism to process all twelve channels corresponding to the twelve satellites.

The processor 150 is any processor or processing element that is capable of executing instructions and communicating with input/output devices or circuits. The processor 150 generates control information to the base-band circuit 140 and interfaces to input/output devices or elements. The input/output devices or elements may include any suitable input/output. Examples of the input/output devices or elements include user's keyboard, display, serial communication interface, and parallel input/output processor. The processor 150 may include a central processing unit (CPU), a memory, and any appropriate interfacing devices. Examples of the CPU include general-purpose microprocessors with any architecture (e.g., superscalar, vector processor, reduced instruction set computer), micro-controllers, digital signal processors, embedded processors.

The oscillator 160 provides a basic clock signal to the base-band circuit 140. The basic clock signal is then divided into many clock signals having various frequencies compatible with the GPS timings. In one embodiment, the basic clock signal has a frequency of $48*f_0$. The base-band circuit 140 derives other clock signals using the basic clock signal. These clock signals are used to synchronize the elements and/or devices in the base-band circuit 140. The base-band circuit 140 also provides clock and/or timing signals to the RF front end circuit 120.

Figure 2:
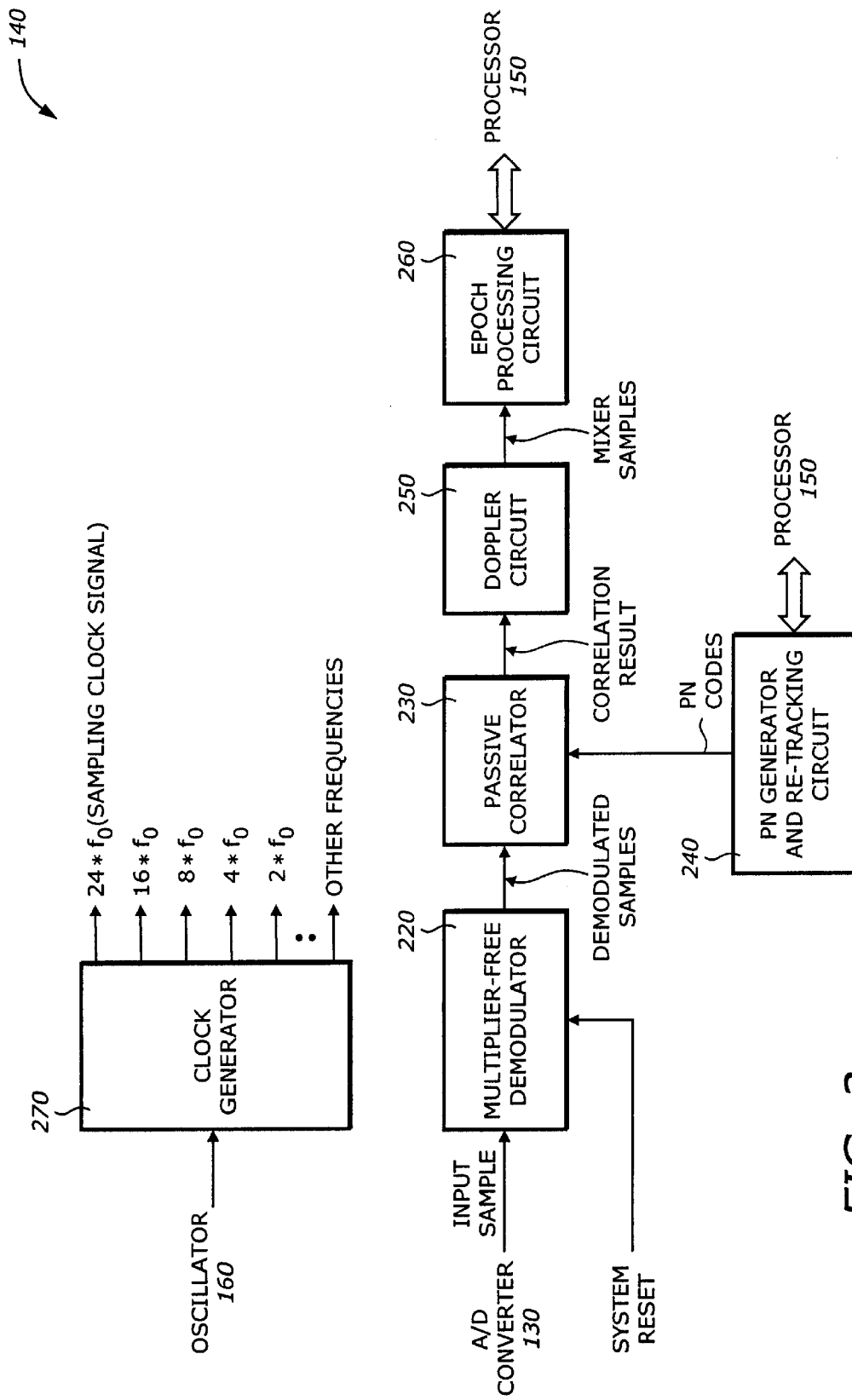
FIG. 2 is a diagram illustrating a base-band circuit shown in FIG. 1 according to one embodiment of the invention.

FIG. 2 is a diagram illustrating the base-band circuit 140 shown in FIG. 1 according to one embodiment of the invention. The base-band circuit 140 includes a multiplier-free demodulator 220, a low-power passive correlator 230, a pseudo random number (PN) generator and re-tracking circuit 240, a Doppler circuit 250, an epoch processing circuit 260, and a clock generator 270.

The multiplier-free demodulator 220 is a base-band down converter to bring the signal to zero IF. This is accomplished by multiplying the input samples with sine and cosine of angles differing by 90° to split into in-phase (I) and quadrature (Q) components. In one embodiment, the signal is over sampled at a sampling frequency that is $4q$ (where q is an integer) times higher than the signal frequency. An efficient mixer is used to replace the multiplier by an equivalent operation. Then, the resulting samples are decimated to keep the samples within a desired frequency range.

The low-power passive correlator 230 correlates the decimated samples from the multiplier-free demodulator 220 with PN code samples which are locally generated. The passive correlator 230 is a de-spreader to recover the transmitted signal samples at the proper frequency range. The PN code samples are part of a PN sequence. In one embodiment, the PN sequence has a length of 1023. The passive correlator 230 works with two phases per chip and checks blocks of 2N phases for synchronization for all K satellite channels. N is an integer selected so that the PN sequence can be processed over a multiple of times. Possible values for N to allow an evenly divisible number of times from the PN sequence length of 1023 are N=3, 11, and 31. The values 1023, 3, 11, and 31 are for illustrative purposes only. The choice of 3 provides a very short turn-off time. The choice of 31 increases the hardware complexity. The choice of 11 is a compromise between hardware complexity and turn-off time. As is known by one skilled in the art, any other numbers can be used. Correlation between the data samples and the PN code samples typically involves shifting operations to shift the data samples and the PN code samples in synchrony. Each time new samples are shifted in a multiplication is performed on the newly shifted samples to produce a product. For a block of N samples, there are N products. Thereafter, an addition is performed on the N products to produce a correlation result for that block. The passive correlator 230 reduces power consumption caused by shift registers by using a multiplexing data writing technique. In addition, the multiplication and addition are much simplified to keep the correlation result within a small number of bits. In one embodiment, the correlation result or output of the passive correlator 230 is 6-bit including a sign bit.

The pseudo random number (PN) generator and re-tracking circuit 240 generates the PN code samples to the passive correlator 230. To distinguish various satellites, a unique PN code is assigned to each satellite. These codes are chosen for maximum orthogonality to maximize detectability. The PN code samples are generated for N satellites sequentially. The generation of the PN code samples is clocked by a numerically controlled oscillator (NCO). For re-tracking, the NCO can advance or slip over a number of chips. The number of chips advanced or slipped may be any number. In one embodiment, this number ranges from 0 to 5.5 (e.g., 1, 2, 3, 4, 5, or 5.5). The PN generator and re-tracking circuit 240 is controlled by the processor 150. The processor 150 determines how many chips the PN code have to be shifted and loads an appropriate number into the PN generator and re-tracking circuit 240 and a shift command.

The Doppler circuit 250 removes the Doppler shifts on the correlation outputs from the passive correlator 230. This is performed by another mixer circuit to mix the de-spreaded samples with the sine and cosine values provided by a carrier NCO for a selected satellite. For N satellites, N carrier NCO's are used. The Doppler circuit 250 sequences through the N carrier NCO's.

The epoch processing circuit 260 processes the data at the end of each epoch. At the end of each epoch, the PN code samples are filled with all 1's. The epoch processing circuit 260 sequences through the N satellite channels. The result samples are accumulated or added to provide final result for each satellite. A double-buffered memory scheme is used to allow storing one set of samples in a first memory while a set of results is read out to a second memory. The processor 150 then can access the second memory to retrieve the results for further processing.

The clock generator 270 generates various clock signals to be used by other circuits in the base-band circuit 140. In one embodiment, the clock generator 270 receives the basic clock signal at 48 times the nominal frequency f0. From this basic clock signal, the clock generator 270 generates all or a subset of the following clock signals: a sampling clock signal at $24*f_0$, a clock signal at $16*f_0$, a clock signal at $8*f_0$, a clock signal at $4*f_0$, and a clock signal at $2*f_0$. The clock generator 270 may be implemented by a number of methods. One method is to use a counter clocked by the basic clock signal and some logic gates. The outputs of the counter are the divide-by-K clock signals that have frequencies of $24*f_0$, $16*f_0$, $8*f_0$, $4*f_0$, and $2*f_0$. To prevent clock skewing, additional delay elements may be inserted as appropriate.

Figure 3:
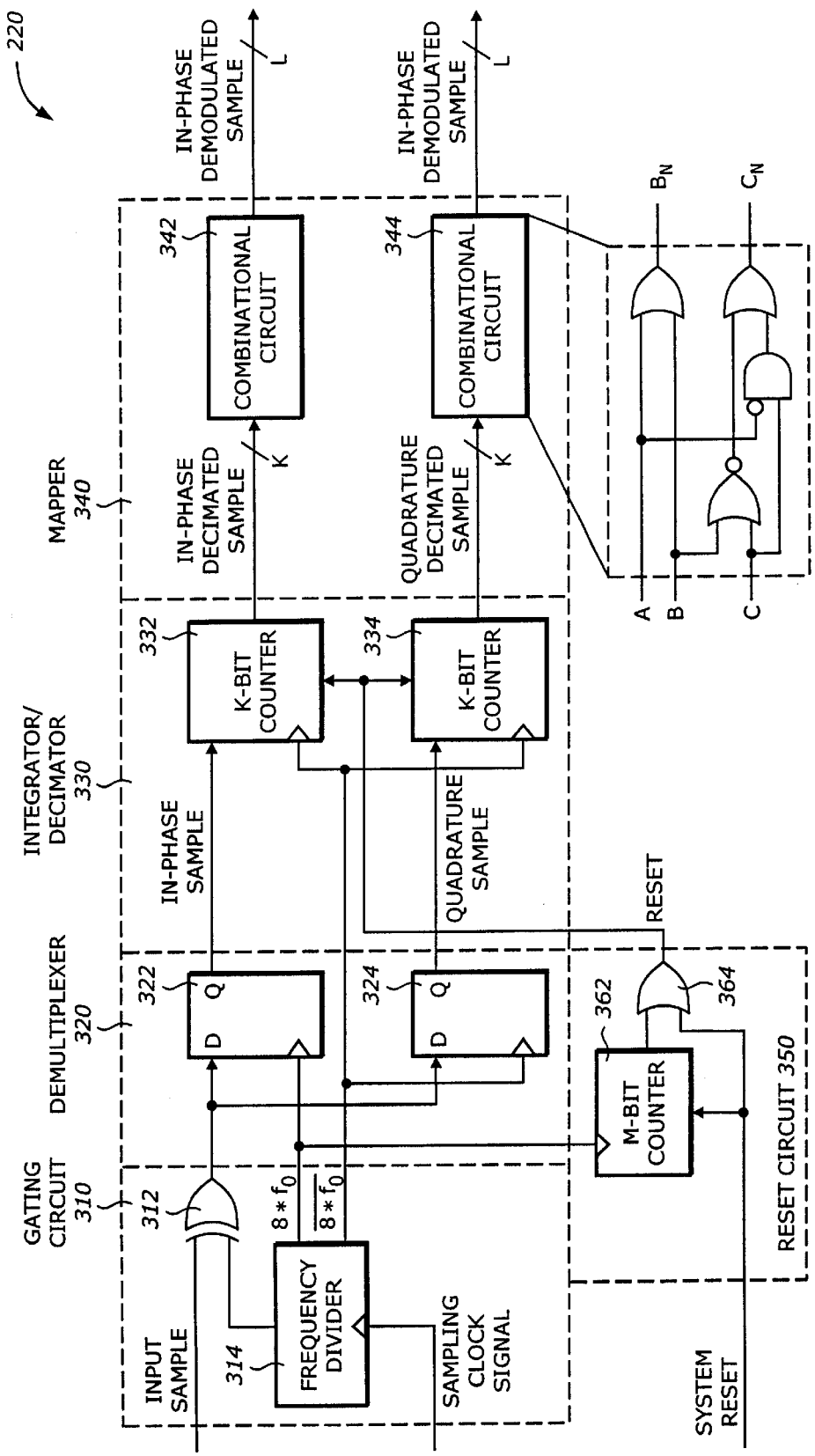
FIG. 3 is a diagram illustrating a multiplier-free demodulator shown in FIG. 2 according to one embodiment of the invention.

FIG. 3 is a diagram illustrating the multiplier-free demodulator 220 shown in FIG. 2 according to one embodiment of the invention. The demodulator 220 includes a gating circuit 310, a demultiplexer 320, an integrator/decimator 330, a mapper 340, and a reset circuit 350.

The gating circuit 310 essentially performs a multiplication of the input samples with the sine and cosine values without using an actual multiplier. As discussed earlier, the input samples are one-bit samples clocked at the sampling clock signal having a frequency of $16*f_0$. The input samples are then multiplied by two-bit sine and cosine values at $4*f_0$. This multiplication is equivalent to multiplication by two consecutive +1's and two −1's. Furthermore, since the input samples are one-bit having logic values of 0 and 1, the multiplication can be efficiently performed by an exclusive OR operation. The gating circuit includes an exclusive OR gate 312 and a frequency divider 314. The exclusive OR gate 312 performs the multiplication between the input samples and the sine/cosine values of two consecutive +1's and two −1's. The sine and cosine values can be encoded as +1's and 0's. The frequency divider 314 generates the sine/cosine values of +1's and 0's. The frequency divider 314 can be implemented as two flip-flops connected in cascade to effectively divide the sampling clock by four to provide a clock signal having a frequency of $4*f_0$. The frequency divider 314 also generates two complementary clock signals at frequency of $8*f_0$: one is true form and one is in complementary form. These two complementary $8*f_0$ clock signals are used by the demultiplexer 320. The gating circuit 314 generates a gated input sample at the frequency of the sampling clock signal.

The demultiplexer 320 essentially splits the mixed input samples into in-phase and quadrature components. This is performed by demultiplexing the gated input sample into two signals. The demultiplexer 320 includes two synchronizers 322 and 324. The synchronizers 322 and 324 synchronizes the gated input sample by the true and complementary form of the $8*f_0$ clock signal, respectively, to generate the in-phase and quadrature samples. Since the synchronizers 322 and 324 are clocked by the $8*f_0$ clock signal, they essentially down sample the gated input samples at $8*f_0$ frequency by a factor of two.

The integrator/decimator 330 further down samples or decimates the in-phase and quadrature samples by integrating them in an integration interval. The integration interval is selected to be equivalent to a four-sample interval so that the down sampling bring the gated input samples to $2*f_0$ samples/sec. This can be done effectively by counting the number of 1's in the gated input sample in a 4-sample interval. The integrator/decimator 330 includes two K-bit counters 332 and 334 to count the number of 1's in the in-phase and quadrature samples from the synchronizers 322 and 324, respectively. The K-bit counters 332 and 334 are reset by a reset signal generated from the reset circuit 350. This reset signal is to start a new integration interval. The K-bit counters 332 and 334 generate in-phase and quadrature decimated samples, respectively, to the mapper 340. K is selected to ensure that the count value can cover the possible range of numbers. Note that the in-phase or quadrature sample is one-bit. Therefore, the possible numbers of bit 1's in the in-phase or quadrature sample in a 4-sample integration interval are 0, 1, 2, 3, and 4. If +1's and −1's are used to encode the integrated samples, these numbers are equivalent to −2, −1, 0, +1, and +2. To represent these numbers, K would have been 3. In other words, the effect of down sampling is that each sample becomes a three-bit sample.

The mapper 340 maps the in-phase and quadrature decimated samples into in-phase and quadrature demodulated samples, respectively. The in-phase and quadrature demodulated samples have L bits where L is less than K. This mapping reduces the number of bits to represent the in-phase and quadrature decimated samples for more efficient processing. This mapping acts like a lower and upper hard limiter on the {0, 1, 2, 3, 4} range to limit the lower value to 1 and the upper value to 3. In other words, 0 and 1 are mapped into 1, 2 is mapped into 2, 3 and 4 are mapped into 3. The mapper 340 includes two combinational circuits 342 and 344 to perform this mapping for the in-phase and quadrature decimated samples, respectively. The three input A, B, and C of the decimated samples are mapped into two outputs $B_N$ and $C_N$ as shown in FIG. 3. The two-bit in-phase and quadrature demodulated samples are fed to the passive corrrelator 230 for further processing.

The reset circuit 350 resets the integrator/decimator 330 at the end of each integration interval. The reset circuit 350 includes an M-bit counter 362 and an OR gate 364.

The M-bit counter 362 is clocked by the true form of the $8*f_0$ clock signal and is reset by a system reset signal. The M-bit counter 362 generates a terminal count signal when the maximum count is reached. The OR gate 364 performs an OR operation between the terminal count signal of the M-bit counter 362 and the reset signal. When the reset signal or the terminal count signal is asserted, the reset circuit 350 asserts the reset signal to reset both the K-bit counters 332 and 334 in the integrator/mapper 330. M is selected to correspond to the integration interval. In one embodiment, the integration interval is equivalent to 4-sample interval and M is equal to 2.

Figure 4:
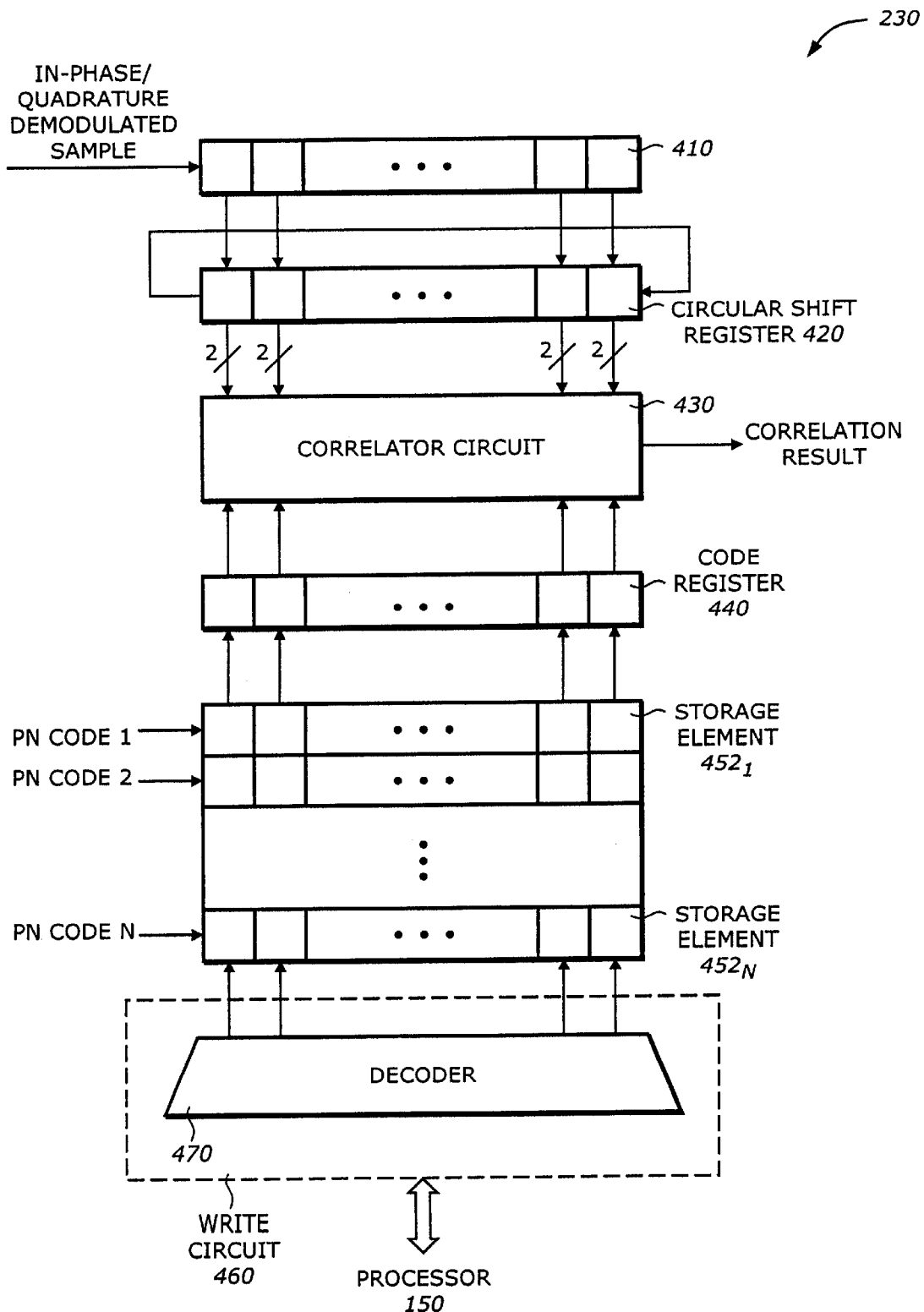
FIG. 4 is a diagram illustrating a low power passive correlator shown in FIG. 2 according to one embodiment of the invention.

FIG. 4 is a diagram illustrating the low power passive correlator 230 shown in FIG. 2 according to one embodiment of the invention. The passive correlator 230 includes a load register 410, a circular shift register 420, a correlator circuit 430, a code register 440, N storage elements $452_1$ to $452_N$, and a write circuit 460. Note that for simplicity, only one passive correlator is shown. For completeness, two passive correlators are used to process the in-phase and quadrature components.

The load register 410 receives the two-bit in-phase and quadrature demodulated samples from the demodulator 220. The load register 410 transfers its contents to the circular shift register 420 at a clock rate equivalent to $2*f_0/M$ where M is the number of demodulated samples to be stored in the load register 410. In one embodiment, the load register 410 has twenty-two elements (or M=22) to store a block of 11 samples of two phases. The selection of the number 11 is explained above. The load register 410, therefore, is organized to store a total of forty-four bits. For a nominal value of $f_0=1.023$ MHz, the transfer rate from the load register 410 to the circular shift register 420 is 93 KHz or a period of 10.75 μsec.

The circular shift register 420 circularly shifts a demodulated sample into a data position at the $2*f_0$ clock rate. In one embodiment, the shift is left shift and circular in that the leftmost sample is shifted into the rightmost position.

The correlator circuit 430 computes a correlation result from the demodulated samples and the code samples provided by the code register 440. During the $2*f_0$ clock period, the correlator circuit 430 computes correlation results for twelve satellites.

The code register 440 stores M PN code samples transferred from one of the N storage elements $452_1$ to $452_N$. The N storage elements $452_1$ to $452_N$ store N PN code sequences corresponding to N satellites. All N storage elements $452_1$ to $452_N$ operate in synchrony. The N PN code sequences come from the PN generator and re-tracking circuit 240 (FIG. 2). The writing of the N PN code samples into the N storage elements $452_1$ to $452_N$ is synchronized with the circular shifting of the circular shift register 420 so that correct phase values are correlated with correct code samples. For each storage element, a code sample is written into the storage element at a code position corresponding to a data position of the corresponding demodulated sample in the circular shift register 420. This writing is essentially equivalent to shift the N storage elements $452_1$ to $452_N$ synchronously with the circular shifting of the circular shift register 420. By avoiding using N shift registers to shift N PN code sequences, significant reduction of power consumption is achieved. The synchronous operation between the circular shift register 420 and the N storage elements $452_1$ to $452_N$ is explained more in FIG. 6. The N storage elements $452_1$ to $452_N$ may be implemented as N rows of flip-flops where each row has M flip-flops, N registers with selectable data write, or N rows of a static random access memory (RAM), or any other suitable storage devices.

The write circuit 460 writes N code samples into the N storage elements $452_1$ to $452_N$ at the N code positions corresponding to the data position of the circular shift register 420. The write circuit 460 includes a decoder 470 to enable the N code positions for writing synchronously with the shifting of the circular shift register 420. If each of the N storage elements $452_1$ to $452_N$ is implemented by M flip-flops, the decoder 470 essentially enables the gating of the clock signal that clocks the flip-flops.

After a short turn-off time, the passive correlator 230 allows for re-tracking in principle within 10.75 $\mu$s if the PN code has drifted away +/−5.5 chips. That is equivalent to about 5.5 $\mu$s change in one pseudo range. Assuming 300,000 km/s speed of light that corresponds to a satellite moving 1.67 km toward or away from the receiver, and assuming that the speed of a satellite is 3 km/s, then under worst-case conditions without further signal processing, it is possible to turn off the receiver for 0.5 second. This turn-off time results in a large reduction of power consumption. In reality, the correlator output has to be integrated over many cycles to be valid. The satellite movement also follows certain predictable paths. It is then possible despite the multiple integration requirements to keep the GPS unit turned off for many seconds.

Figure 5:
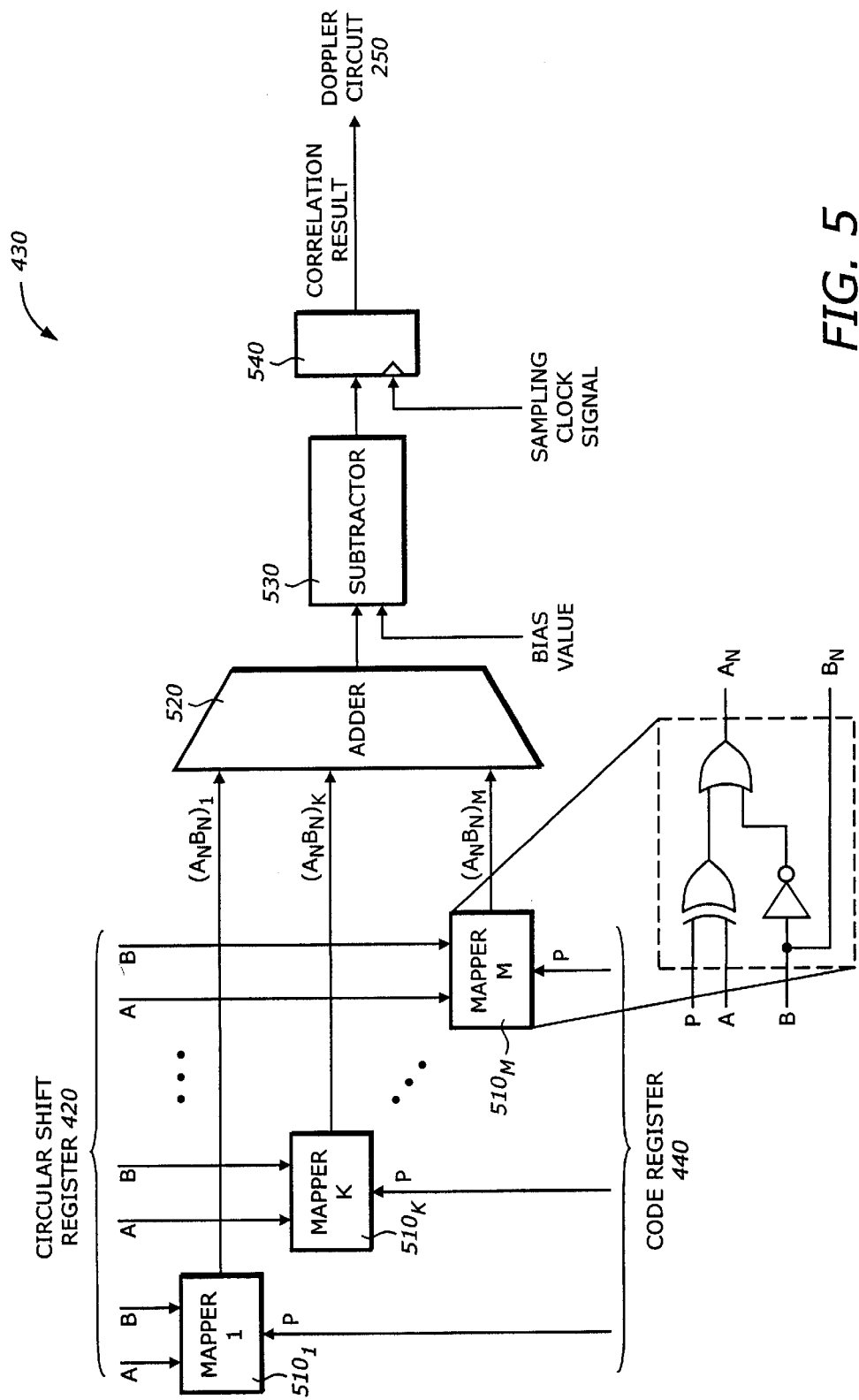
FIG. 5 is a diagram illustrating a correlator circuit shown in FIG. 4 according to one embodiment of the invention.

FIG. 5 is a diagram illustrating the correlator circuit 430 shown in FIG. 4 according to one embodiment of the invention. The correlator circuit 430 includes M mappers $510_1$ to $510_M$, an adder 520, a subtractor 530, and a register 540.

The M mappers $510_1$ to $510_M$ map the M two-bit demodulated samples and the corresponding M one-bit code samples in the code register 440 to generate M two-bit mapper outputs. The mapping is essentially equivalent to a multiplication of the demodulated sample with the code sample.

In addition, the mapping also provides a proper bit representation for the data to simplify the implementation. Each of the M mappers $510_1$ to $510_M$ is implemented by a combinational circuit including an exclusive-OR gate, an OR gate, and an inverter as shown in FIG. 5. This mapping is further explained in FIGS. 7A through 7C.

The adder 520 adds the M two-bit mapper outputs to generate a result sum. The subtractor 530 subtracts a bias value from the result sum to generate the correlation result. The register 540 stores the correlation result at the sampling clock rate.

Figure 6:
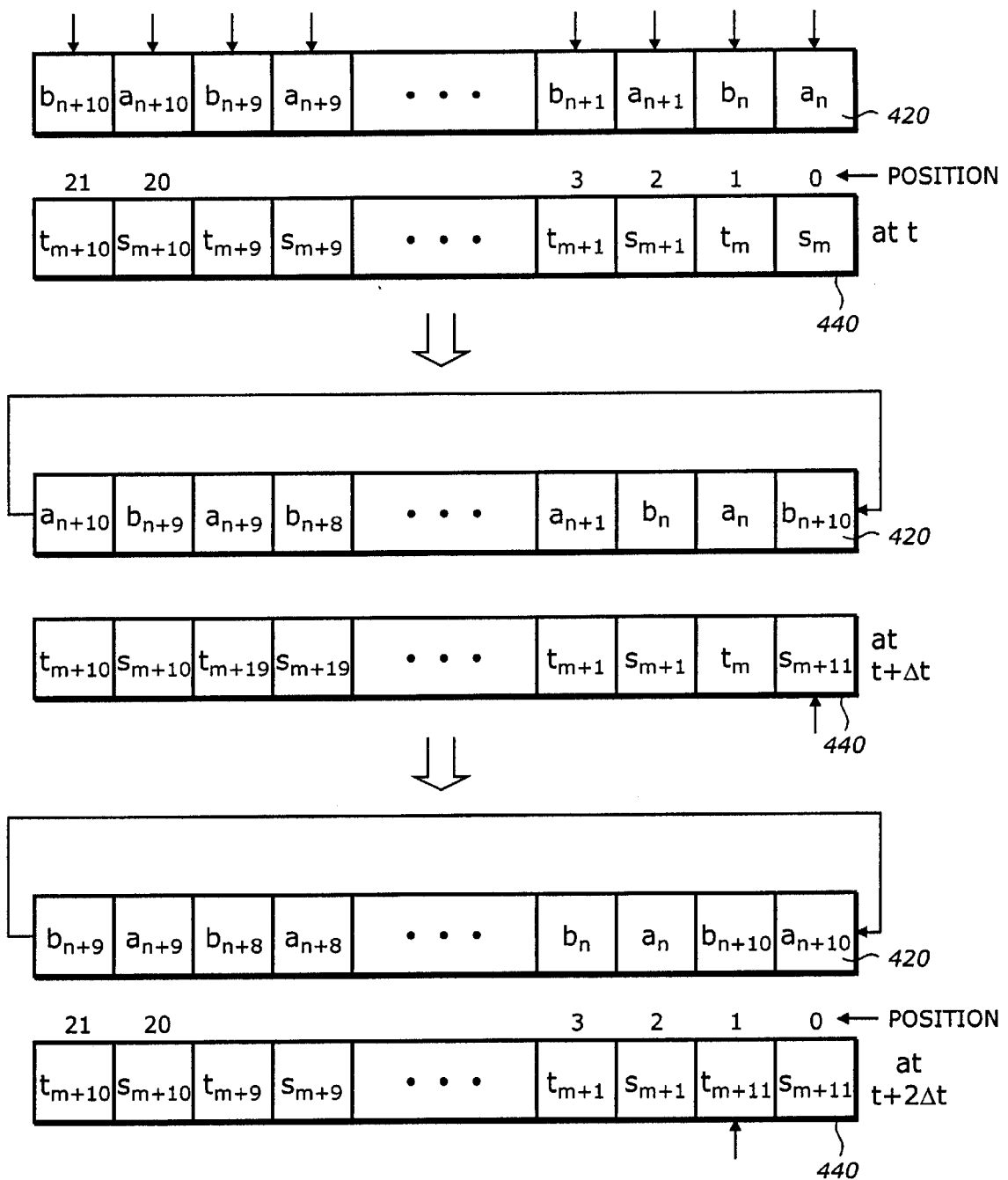
FIG. 6 is a diagram illustrating the synchronous operation between the circularly shifted data register and the code register shown in FIG. 4 according to one embodiment of the invention.

FIG. 6 is a diagram illustrating the synchronous operation between the circularly shifted data register and the code register shown in FIG. 4 according to one embodiment of the invention.

At time t, the circular shift register 420 is parallel loaded with 11 pairs of demodulated samples. Each pair includes two phases a and b. The 22 samples are ($a_n$, $b_n$), ($a_{n+1}$, $b_{n+1}$), ..., ($a_{n+10}$, $b_{n+10}$). At the same time, the code register 440 is loaded with the corresponding 11 pairs of code samples from one of the N storage elements $452_1$ to $452_N$. The 22 code samples are ($s_m$, $t_m$), ($s_{m+1}$, $t_{m+1}$), ..., ($S_{m+10}$, $t_{m+10}$).

At time t+Δt, the circular shift register 420 circularly shifts the 22 samples so that each sample is shifted to the left and the left most sample $b_{n+10}$ is shifted to occupy the rightmost position. At the same time, the writing circuit 460 (FIG. 4) writes to the rightmost position of the N storage elements $452_1$ to $452_N$. Then the code register is loaded with one of the N storage elements $452_1$ to $452_N$. Note that the code register 440 is loaded with contents of all the N storage elements corresponding to the N satellites within the Δt time interval. The remaining code samples remain the same.

At time t+2Δt, the circular shift register 420 circularly shifts the 22 samples so that each sample is shifted to the left and the left most sample $a_{n+10}$ is shifted to occupy the rightmost position. At the same time, the writing circuit 460 (FIG. 4) writes to the next rightmost position of the N storage elements $452_1$ to $452_N$. Then the code register is loaded with one of the N storage elements $452_1$ to $452_N$. The remaining code samples remain the same. The process continues when all M code samples are written into the N storage elements $452_1$ to $452_N$. At time t+kΔt, N code samples are written into the code position k while the other code positions contain the same code samples. Thereafter, a new sequence of M demodulated samples is transferred to the circular shift register 420 and the process repeats.

By using N storage elements $452_1$ to $452_N$ and a clever writing mechanism, it is not necessary to use N shift registers. This results in a significant reduction of power consumption.

FIG. 7A is a diagram illustrating a range of correlation result using the actual ranges according to one embodiment of the invention. In this illustrative example, M=22 corresponding to two phases of the 11 samples.

The demodulated sample may be one of −1, 0, and +1 values. The PN code sample may be one of −1 and +1. When multiplied together, the product may be one of −1, 0, and +1 result. When added together, the 22 products may form a sum having a range of {−22, +22}.

FIG. 7B is a diagram illustrating a range of correlation result using the represented ranges according to one embodiment of the invention.

The demodulated samples are encoded to have representations of 01, 10, and 11, corresponding to −1, 0, and +1, respectively. The PN code sample is represented by 0 and 1, corresponding to −1 and +1, respectively. The mapper M maps the product to 1, 2, and 3, corresponding to −1, 0, and +1, respectively. The adder produce a sum in the range of {+22, +66}. The subtractor subtracts a bias value of 22 from the sum so that the result has a range of {0, +44}. This range can be represented by a 6-bit result.

FIG. 7C is a diagram illustrating a mapping of the correlation result according to one embodiment of the invention.

The mapping is equivalent to a multiplication of −1, 0, +1 and −1, +1. The mapping implements the following multiplication table.

| Data sample | Code sample | Product |
| --- | --- | --- |
| 01 (−1) | 0 (−1) | 01 (+1) |
| 01 (−1) | 1 (+1) | 11 (−1) |
| 10 (0)  | 0 (−1) | 10 (0)  |
| 10 (0)  | 1 (+1) | 10 (0)  |
| 11 (+1) | 0 (−1) | 11 (−1) |
| 11 (+1) | 1 (+1) | 01 (+1) |

Note that the values inside parentheses represent the actual values. Other mappings are possible. The mapping can be implemented by a combinational circuit for the mapper shown in FIG. 5.

Figure 8A:
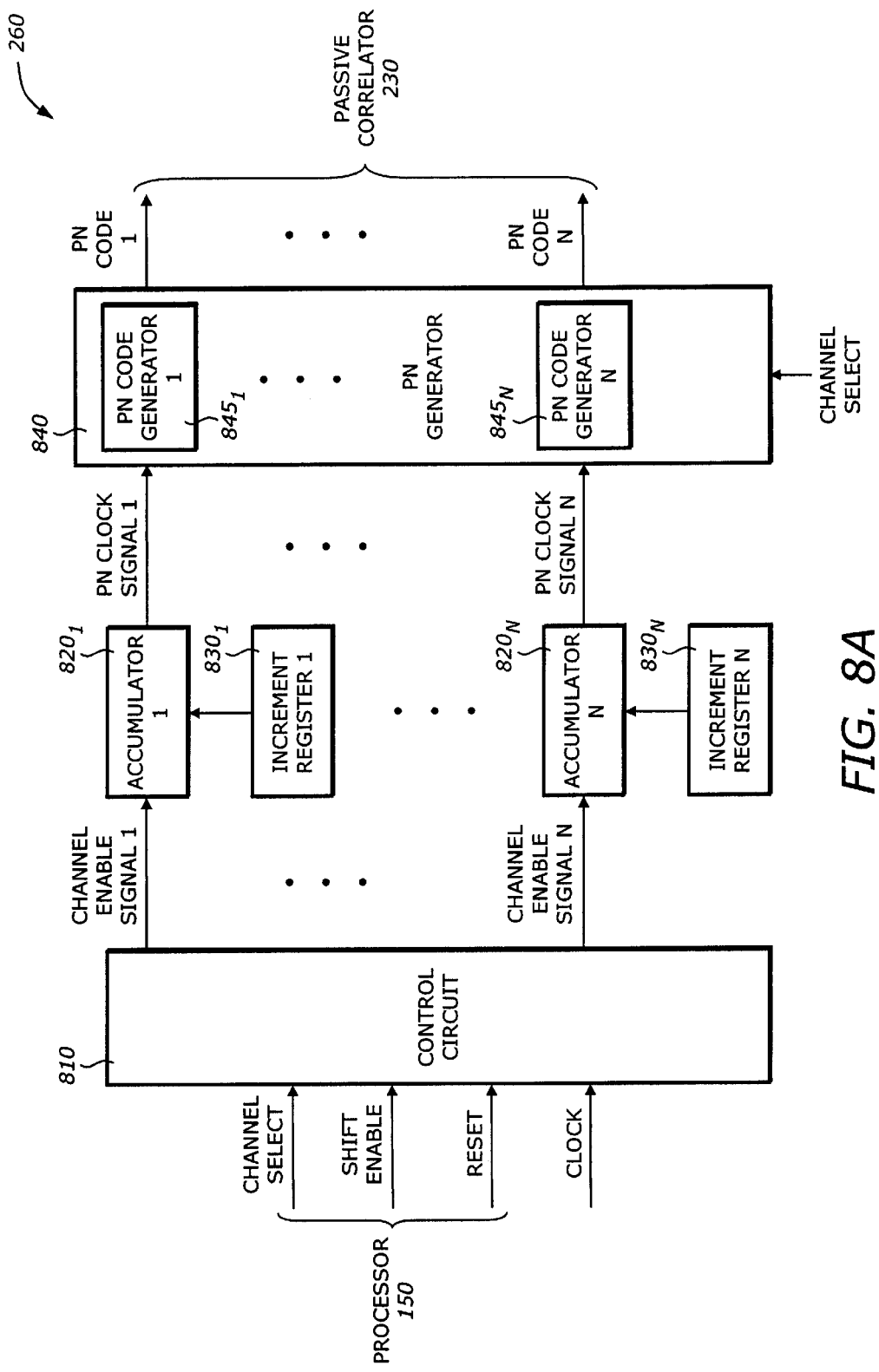
FIG. 8A is a diagram illustrating a pseudo random number generator and re-tracking circuit shown in FIG. 2 according to one embodiment of the invention.

FIG. 8A is a diagram illustrating the pseudo random number (PN) generator and re-tracking circuit 240 shown in FIG. 2 according to one embodiment of the invention. The PN generator and re-tracking circuit 240 includes a control circuit 810, N accumulators $820_1$ to $820_N$, N increment registers $830_1$ to $830_N$ and a PN generator 840.

The control circuit 810 generates at least a channel enable signal based on control information from the processor 150 (FIG. 1) at the $8*f_0$ frequency. For N satellites, the control circuit 810 generates N channel enable signals. The control information includes at least one of channel select information, an initial count, an increment value, and PN command.

Each of the N accumulators $820_1$ to $820_N$ generates a PN clock signal corresponding to the selected satellite channel based on the increment value. The PN clock signal is used by the PN generator 840. Each of the N accumulators $820_1$ to $820_N$ is enabled by a corresponding channel enable signal from the control circuit 810.

Each of the N increment registers $830_1$ to $830_N$ stores an increment value of the corresponding satellite channel at the $8*f_0$ frequency. The processor 150 selects a satellite channel by writing the channel select information and writes the increment value to the selected channel. In one embodiment, each of the N increment registers $830_1$ to $830_N$ has 16 bits.

The PN generator 840 generates N PN code samples to the passive correlator 230 based on the channel select information. As discussed earlier, each of the N satellites has a unique PN code sequence. During normal operation, the PN generator 840 operates at the nominal f0 frequency. During re-tracking, the PN codes are shifted back and forth based on the individual PN clock signals provided by the N accumulators $820_1$ to $820_N$. The PN generator 840 includes N PN code generators $845_1$ to $845_N$ clocked by the PN clock signals from N accumulator $820_1$ to $820_N$, respectively.

Figure 8B:
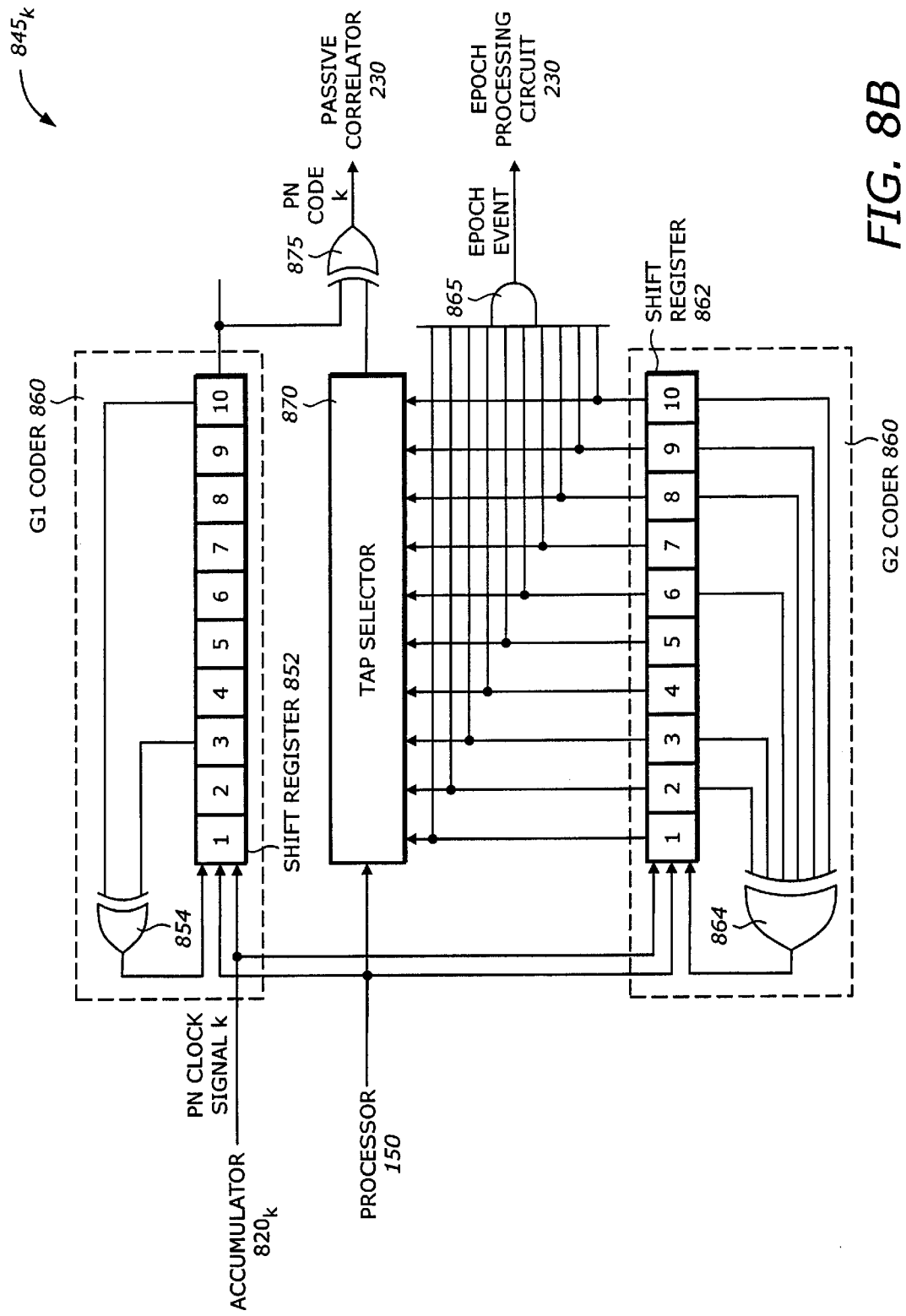
FIG. 8B is a diagram illustrating a PN code generator shown in FIG. 8A according to one embodiment of the invention.

FIG. 8B is a diagram illustrating the PN code generator $845_k$ shown in FIG. 8A according to one embodiment of the invention. The PN code generator $845_k$ includes a G1 coder 850, a G2 coder 860, an AND gate 865, a tap selector 870, and an exclusive OR gate 875.

The G1 coder 850 generates a G1 code sequence. The G1 coder 850 includes a shift register 852 and an exclusive OR gate 854. The shift register 852 has ten elements and shifts the code bits to the right. The shift register 852 is clocked by the PN clock signal k from the corresponding accumulator $820_k$ (FIG. 8A). The processor 150 initially loads the shift register 852 with all 1's. The exclusive OR gate 854 is a two-input exclusive OR gate which perform an exclusive OR operation on elements 3 and 10 of the shift register 852. The output of the exclusive OR gate goes back to the input of the shift register 852.

The G2 coder 860 includes a shift register 862 and an exclusive OR gate 864. The shift register 862 has ten elements and shifts the code bits to the right. The shift register 862 is clocked by the PN clock signal k from the corresponding accumulator $820_k$ (FIG. 8A). The processor 150 initially loads the shift register 862 with all 1's. The exclusive OR gate 864 is a six-input exclusive OR gate which perform an exclusive OR operation on elements 2, 3, 6, 8, 9, and 10 of the shift register 862. The output of the exclusive OR gate 864 goes back to the input of the shift register 862.

The AND gate 865 is a ten-input AND gate which performs an AND operation on all ten elements of the shift register 862. When all the ten elements of the shift register 862 contain all 1's, an epoch event has occurred, i.e., an epoch is ended and a new epoch begins. The output of the AND gate 865, therefore, provides an indication that an epoch has elapsed. This epoch event signal is used by the epoch control circuit in the epoch processing circuit 260 (FIG. 6).

The tap selector 870 selects the taps in the shift register 862 of the G2 coder 860 to be used in generating the PN code k out of the PN generator 840 (FIG. 8A). The selected taps in the shift register 862 are unique for each satellite. The processor 150 writes the selection to the tap selector 870.

The exclusive OR gate 875 performs an X-OR operation on the output of the G1 coder 850 and the output of the tap selector 870 to generate the PN code k.

Figure 8C:
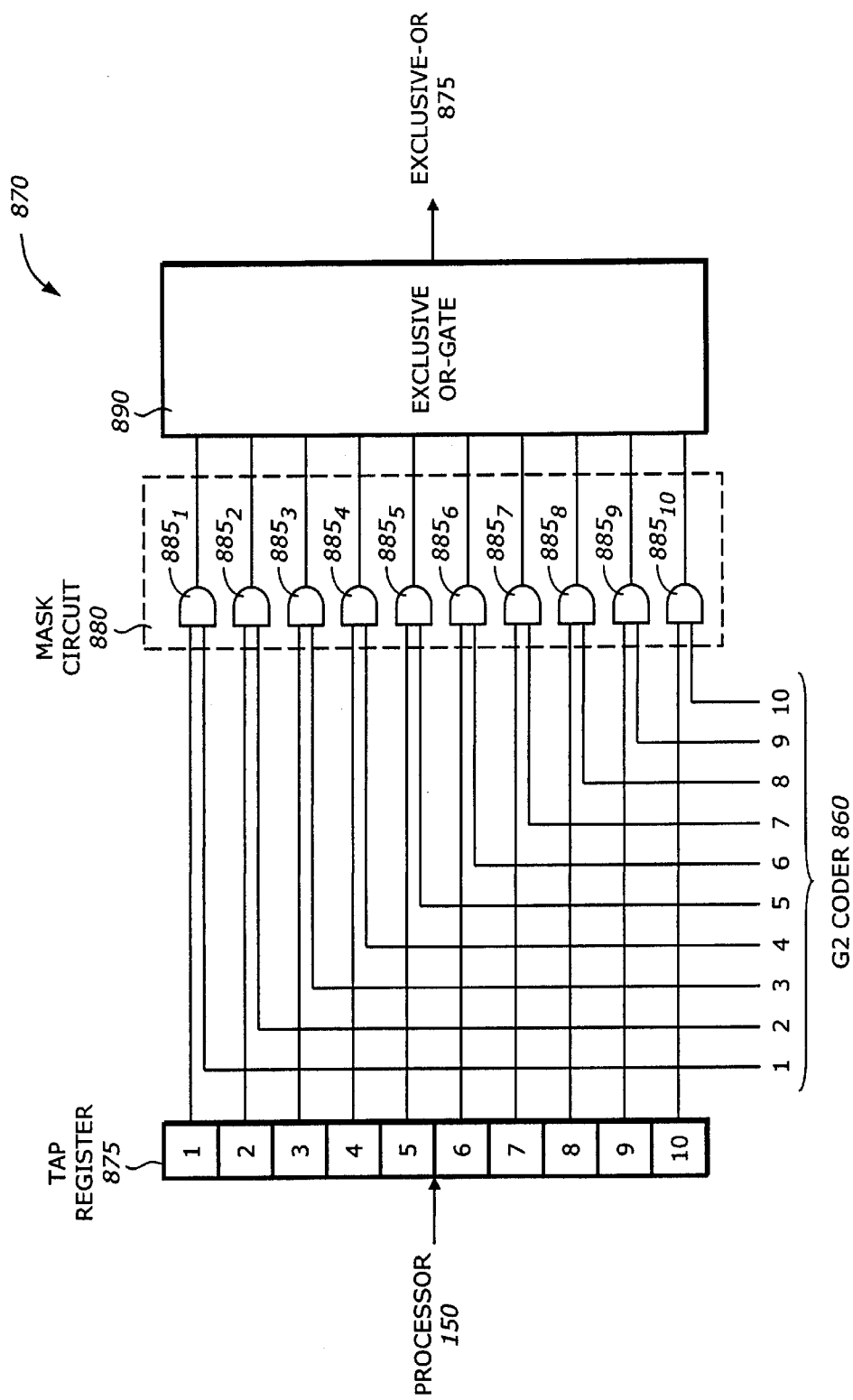
FIG. 8C is a diagram illustrating a tap selector shown in FIG. 8B according to one embodiment of the invention.

FIG. 8C is a diagram illustrating the tap selector 870 shown in FIG. 8B according to one embodiment of the invention. The tap selector 870 includes a tap register 875, a mask circuit 880, and an exclusive OR gate 890.

The tap register 875 has ten elements corresponding to the ten elements of the shift register 862 in the G2 coder 860. The tap register 875 is written by the processor 150 to select the P taps unique to a satellite. In one embodiment, P=2. The mask circuit 880 masks the non-selected taps from the shift register 862 using the tap register 875. The mask circuit 880 includes ten AND gates 8851 to 88510. Each of the AND gate ANDs a cell of the tap register 875 with a corresponding cell of the shift register 862. If any of the cells of the G2 coder 860 are selected, those cells are tapped into the exclusive OR gate 890. The output of the X-OR gate 890 goes to the exclusive OR gate 875.

Figure 9:
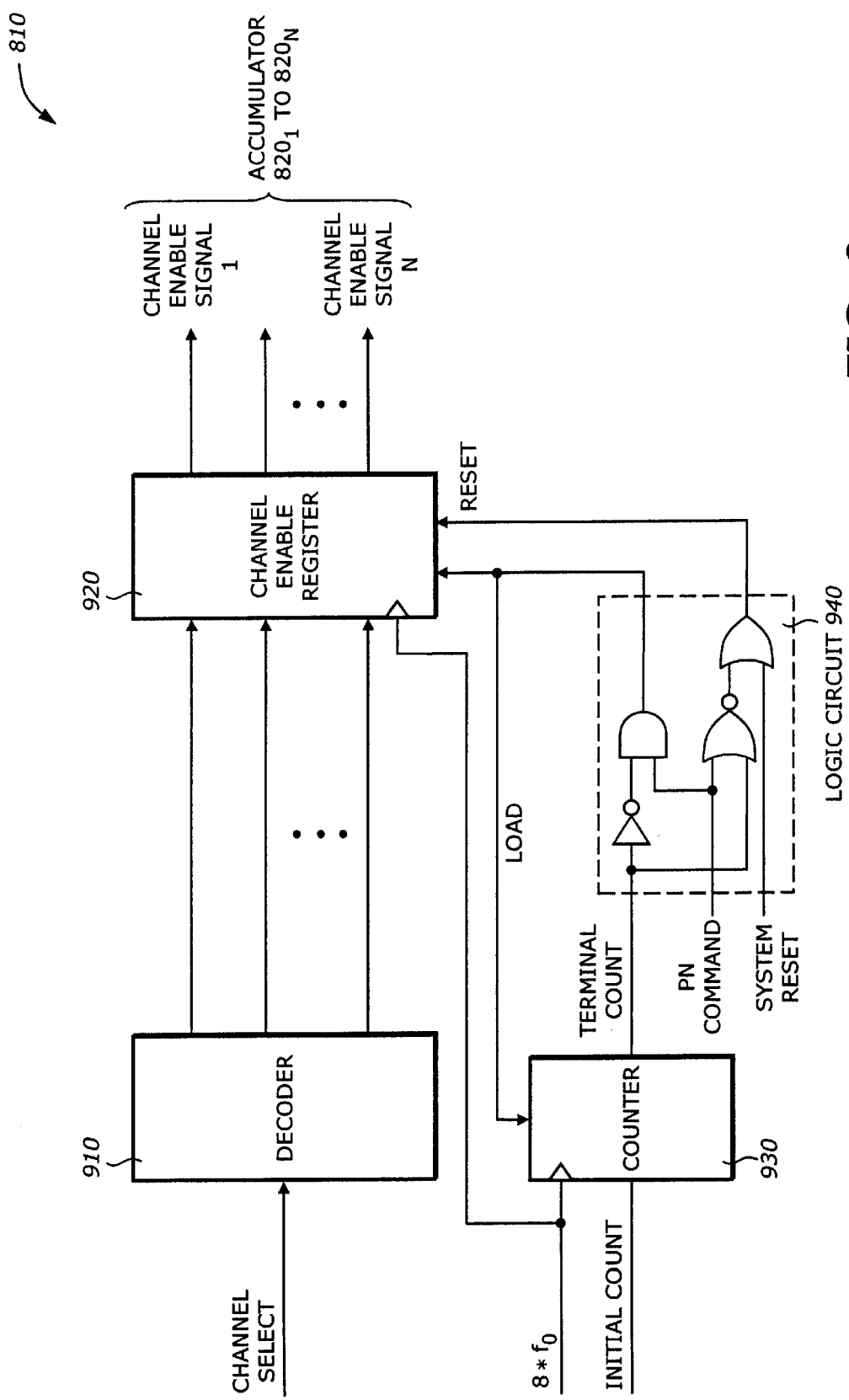
FIG. 9 is a diagram illustrating a control circuit for PN shifting according to one embodiment of the invention.

FIG. 9 is a diagram illustrating the control circuit 810 for PN shifting technique as it applies to one code NCO generator according to one embodiment of the invention. The control circuit 810 includes a decoder 910, a channel enable register 920, a counter 930, and a logic circuit 940.

The decoder 910 receives the channel select information from the processor 150 (FIG. 1) and generates N decoded signals from the channel select information. For N=12, the decoder 910 is a 4-to-12 decoder. The channel enable register 920 stores the decoded signals to generate N channel enable signals at a 8*f0 frequency. The loading of the channel enable register 920 is enabled by the logic circuit 940. The channel enable register 920 is asynchronously reset by the logic circuit 940.

The counter 930 updates a count for the amount of PN shifting required from the initial count at the $8*f_0$ clock signal. When the count reaches a terminal count, the counter 930 generates a terminal signal to reset the channel enable register 920. In one embodiment, the counter 930 is an 8-bit down counter to count from the initial count to zero, i.e., the terminal count is zero. The processor 150 writes the initial count to the counter 930.

The logic circuit 940 generates a load signal and a reset signal. The load signal is to load the counter 930 and the channel enable register 920. The reset signal is to reset the channel enable register 920.

Figure 10:
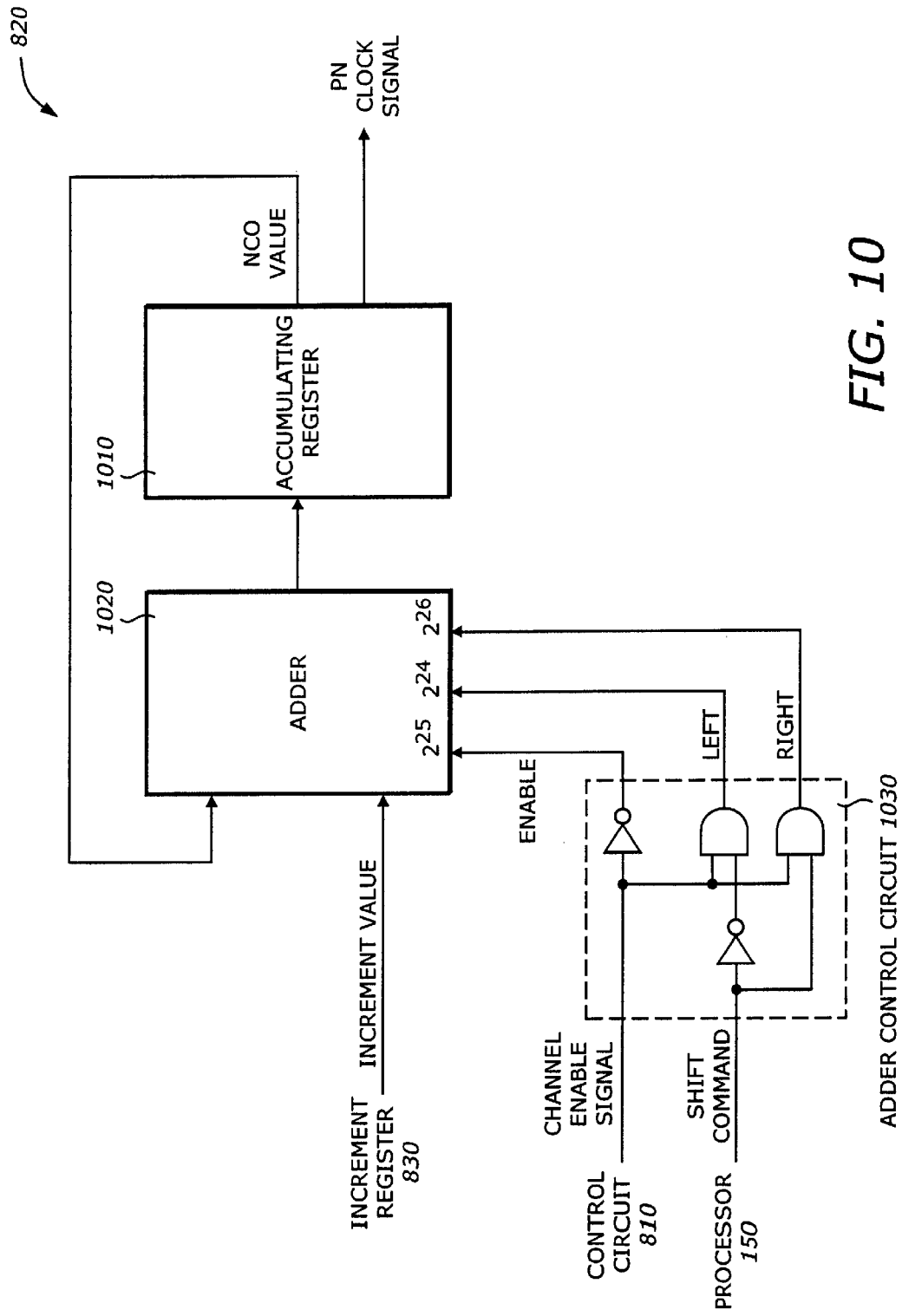
FIG. 10 is a diagram illustrating PV shifting technique as it applies to one code NCO generator according to one embodiment of the invention.

FIG. 10 is a diagram illustrating the PN shifting technique as it applies to one code NCO generator according to one embodiment of the invention. The accumulator 820 includes an accumulating register 1010, an adder 1020, and an adder control circuit 1030.

The accumulating register 1010 stores a NCO value at a current cycle of the $8*f_0$ clock signal. The NCO value provides the PN clock signal for the selected satellite channel. In one embodiment, the accumulating register 1010 has 28 bits and the most significant bit of the NCO value provides the PN clock signal.

The adder 1020 adds the increment value from the corresponding increment register to the NCO value from the accumulating register 1010 to generate a sum representing the NCO value loaded into the accumulating register 1010 in the next clock cycle of the $8*f_0$ clock signal.

The adder control circuit 1030 is a combinational circuit to generate an enable command, a left shift command, and a right shift command to the adder 1020 using the PN command provided by the processor 150 and the channel enable signal from the channel enable register 920 (FIG. 9). When the channel enable signal is de-asserted indicating the satellite channel is not selected, the adder control circuit asserts the enable command which asserts bit 25 of the adder 1020. The bit 25 is selected to correspond to a value $2^{25}$ which is increment corresponding to the PN generator frequency of 1.023 MHz. When the channel enable signal is asserted indicating the satellite channel is selected, the adder control circuit 1030 asserts a left command when the shift command is LOW and asserts a right command when the shift command is HIGH. The left and right commands assert bits 24 and 26, respectively.

The accumulator 820 overflows at the required frequency of $f_g$. In one embodiment, the most significant bit (MSB) of the accumulator output is a square wave of $f_g$ frequency. Let n=28 and m=16 be the number of bits for the accumulating register and the increment value. Let M be the marching value. Let $f_c=8*f_0$ where $f_0=1.023$ MHz. Then:

$$f_g = M f_c / 2^n \quad (1)$$

$$f_g = 1.023 \times 10^6 \, Hz = M*8*(1.023 \times 10^6 \, Hz)/2^{28} \quad (2)$$

$$\rightarrow M = 2^{25} \quad (3)$$

If the frequency fg is advanced by adding to the marching value, then the time it takes to advance by q chips can be calculated as follows.

$$q = [(M+\Delta M)*f_c/2^n - M*f_c/2^n]*t \quad (4)$$

$$t = q/\{\Delta M*f_c)/2^n\} = (q/f_g)*(M/\Delta M) \quad (5)$$

Using the above equations, the time and the number of NCO clock cycles needed to advance or slip up to +/−5.5 chips can be calculated as follows:

$$f_c = 8*f_0 = 8.184 \, MHz, \, m=16, \, n=28, \, M=2^{25}$$

For $f_g=1.023$ MHz:

| Number of chips advanced | T ($\mu$s) | NCO clock cycles |
| --- | --- | --- |
| 1 | 0.977 | 8 |
| 2 | 1.955 | 16 |
| 3 | 2.932 | 24 |
| 4 | 3.910 | 32 |
| 5 | 4.887 | 40 |
| 5.5 | 5.376 | 44 |

For $f_g=2*1.023$ MHz:

| Number of chips slipped | T ($\mu$s) | NCO clock cycles |
| --- | --- | --- |
| 1 | 1.955 | 16 |
| 2 | 3.910 | 32 |
| 3 | 5.065 | 48 |
| 4 | 7.820 | 64 |
| 5 | 9.770 | 80 |
| 5.5 | 10.75 | 88 |

The NCO marching value can be used to advance or slip precisely to within +/−5.5 chips by counting the number of NCO clock cycles all within less than 11 $\mu$s. It is also possible to totally sty NCO clock for a number of cycles to compensate for the slippage.

Figure 11A:
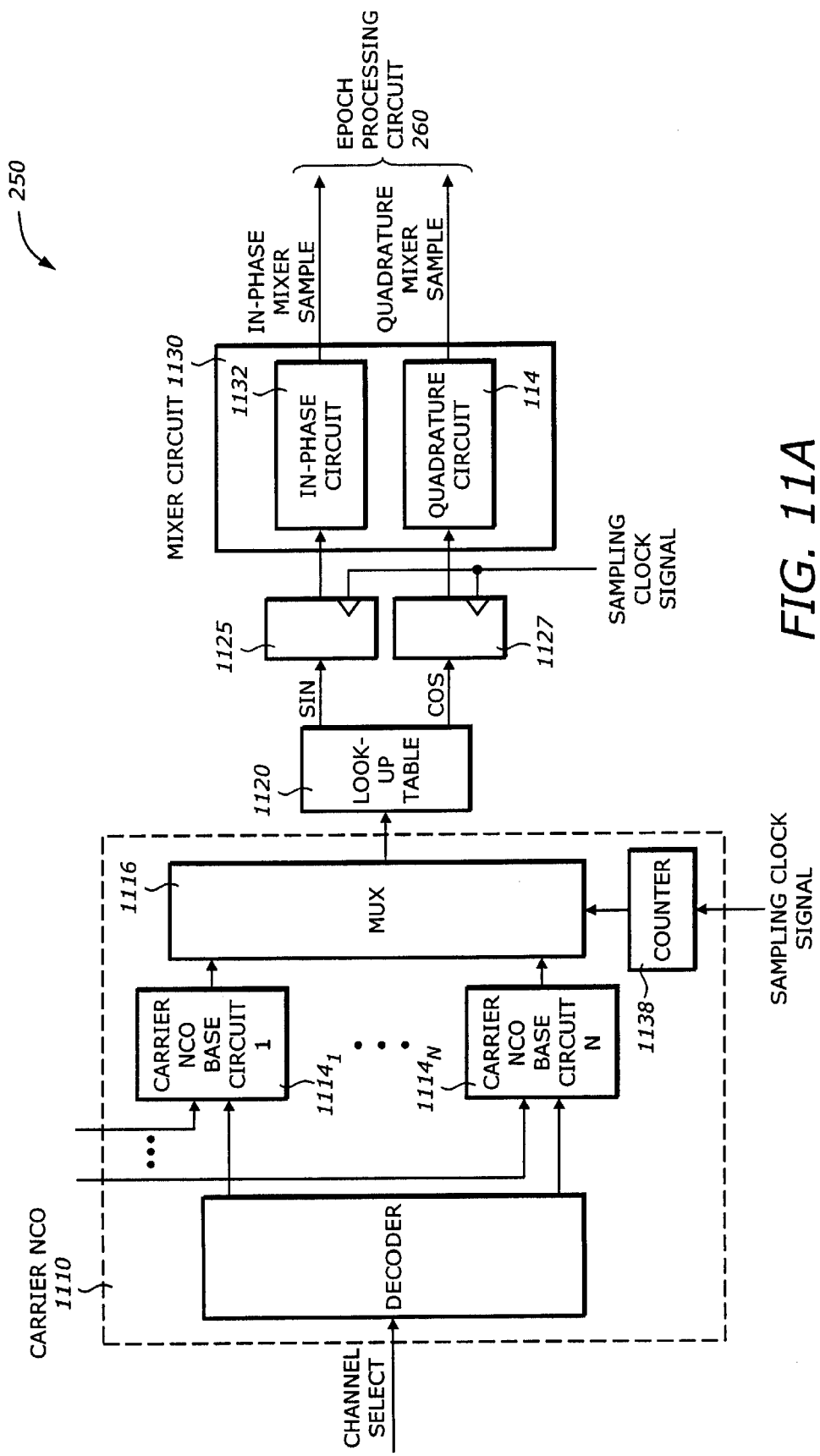
FIG. 11A is a diagram illustrating a Doppler circuit shown in FIG. 2 according to one embodiment of the invention.

FIG. 11A is a diagram illustrating the Doppler circuit 250 shown in FIG. 2 according to one embodiment of the invention. The Doppler circuit 250 includes a carrier NCO 1110, a look up table 1120, two registers 1125 and 1127, and a mixer circuit 1110.

The carrier NCO generates a carrier NCO value to select sine and cosine values from the look up table 1120. The carrier NCO includes a decoder 1112, N carrier NCO base circuits $1114_1$ to $1114_N$, a multiplexer 1116, and a counter 1118. The decoder 1112 generates decoded signals from the channel select information. The decoded signals correspond to the satellite channels. Each of the carrier NCO base circuits $1114_1$ to $1114_N$ provides a carrier NCO value corresponding to the selected satellite channel. In one embodiment, the carrier NCO value is 3-bit. The multiplexer 1116 selects one of the 3-bit N carrier NCO values based on the select signal generated by the counter 1118. The counter 1118 sequences through the N channels and clocked by the sampling clock signal at $24*f_0$ frequency.

The look up table 1120 generates the coefficients based on the carrier NCO value. The coefficients include the sine and cosine values to be used by the mixer circuit 1130. In one embodiment, the sine and cosine values are stored in the look up table 1120 according to the 3-bit carrier NCO values as follows.

| Carrier NCO value | Sine value | Cosine value |
| --- | --- | --- |
| 000 | 000 (0) | 011 (3) |
| 001 | 010 (2) | 010 (2) |
| 010 | 011 (3) | 000 (0) |

-continued

| Carrier NCO value | Sine value | Cosine value |
|---|---|---|
| 011 | 010 (2) | 110 (−2) |
| 100 | 000 (0) | 111 (−3) |
| 101 | 110 (−2) | 110 (−2) |
| 110 | 111 (−3) | 000 (0) |
| 111 | 110 (−2) | 010 (2) |

The two registers 1125 and 1127 store the sine and cosine values from the look up table 1120 at the sampling clock signal of 24*$f_0$ frequency.

The mixer circuit 1130 mixes the demodulated sample from the passive correlator 230 (FIG. 2) with the coefficients (e.g., the sine and cosine values) from the look up table 1120 to generate a mixer sample. The mixer sample includes a mixer in-phase sample and a mixer quadrature sample. The mixer circuit 1130 includes mixer in-phase and quadrature circuits 1132 and 1334 to generate the mixer in-phase and quadrature samples, respectively.

Figure 11B:
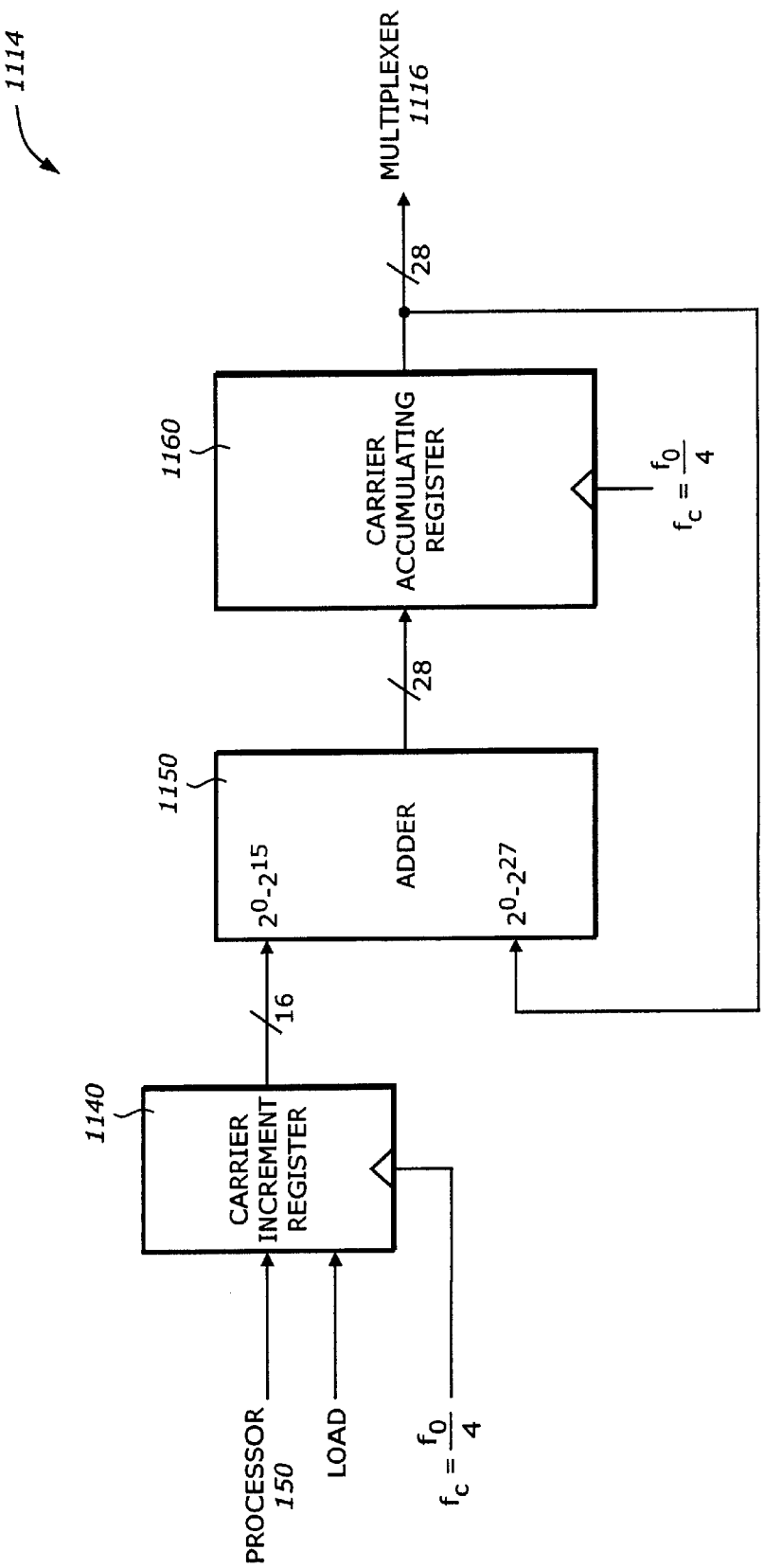
FIG. 11B is a diagram illustrating a carrier NCO base circuit shown in FIG. 2 according to one embodiment of the invention.

FIG. 11B is a diagram illustrating the carrier NCO base circuit 1114 shown in FIG. 2 according to one embodiment of the invention. The carrier NCO base circuit 1114 includes a carrier increment register 1140, an adder 1150, and a carrier accumulating register 1160.

The carrier increment register 1140 stores a carrier increment value provided by the processor 150 at a $f_0/4$ frequency. The adder 1150 adds the carrier increment value to the carrier NCO value stored in the accumulating register 1160 to produce a sum. The sum is then stored in the accumulating register 1160. The accumulating register 1160 stores the sum generated by the adder 1150 at a $f_0/4$ frequency.

Figure 12:
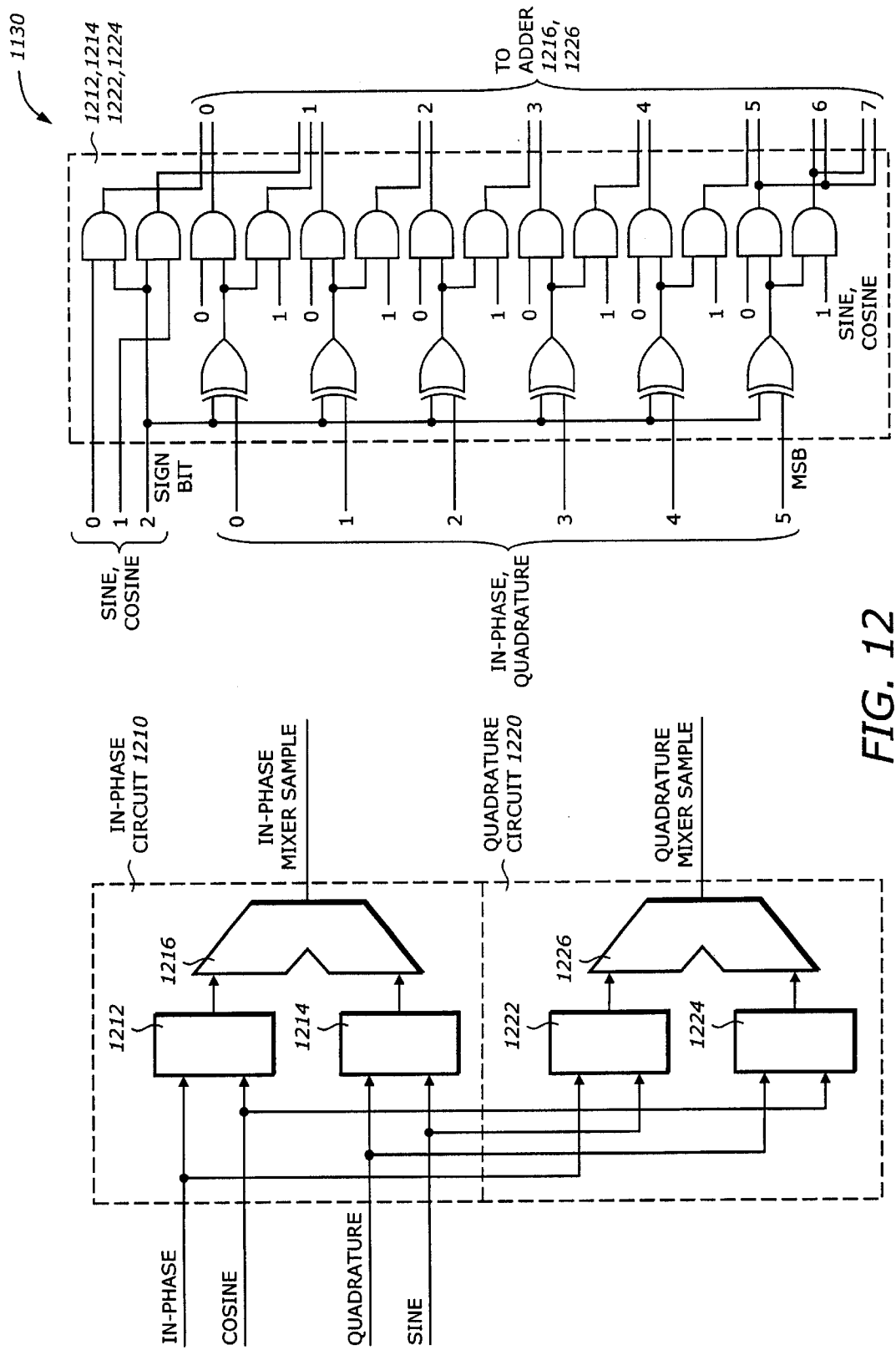
FIG. 12 is a diagram illustrating a mixer circuit shown in FIG. 11 according to one embodiment of the invention.

FIG. 12 is a diagram illustrating the mixer circuit 1130 shown in FIG. 11 according to one embodiment of the invention. The mixer circuit 1130 includes a mixer in-phase circuit 1210 and a mixer quadrature circuit 1220.

The mixer in-phase circuit 1210 generates an in-phase mixer sample $I_m$ from the in-phase and quadrature demodulated samples $I_d$ and $Q_d$ as follows:

$$I_m = I_d * \cos - Q_d * \sin \qquad (6)$$

The mixer quadrature circuit 1210 generates a quadrature mixer sample $Q_m$ from the in-phase and quadrature demodulated samples $I_d$ and $Q_d$ as follows:

$$Q_m = I_d * \sin + Q_d * \cos \qquad (7)$$

where sin and cos are the sine and cosine values provided by the two registers 1125 and 1127, respectively. The $I_m$ and $Q_m$ are the results of complex multiplications between the $I_d$, $Q_d$ with the sine and cosine values.

The mixer in-phase circuit 1210 includes two logic circuits 1212 and 1214 and an adder 1216. Each of the logic circuits 1212 and 1214 essentially performs a multiplication between the 6-bit demodulated sample and the sine or cosine value to generate an 8-bit product considering the range of value at the input and output and the coding method used. The multiplexer is a simplified set of logic gates. The adder 1216 adds the two 6-bit products to provide the in-phase mixer sample according to equation (6). The mixer quadrature circuit 1220 includes two logic circuits 1222 and 1224 and an adder 1226. The two logic circuits 1222 and 1224 are the same as the logic circuits 1212 and 1214. The adder 1226 adds the two 6-bit products to provide the quadrature mixer sample according to equation (7).

Figure 13:
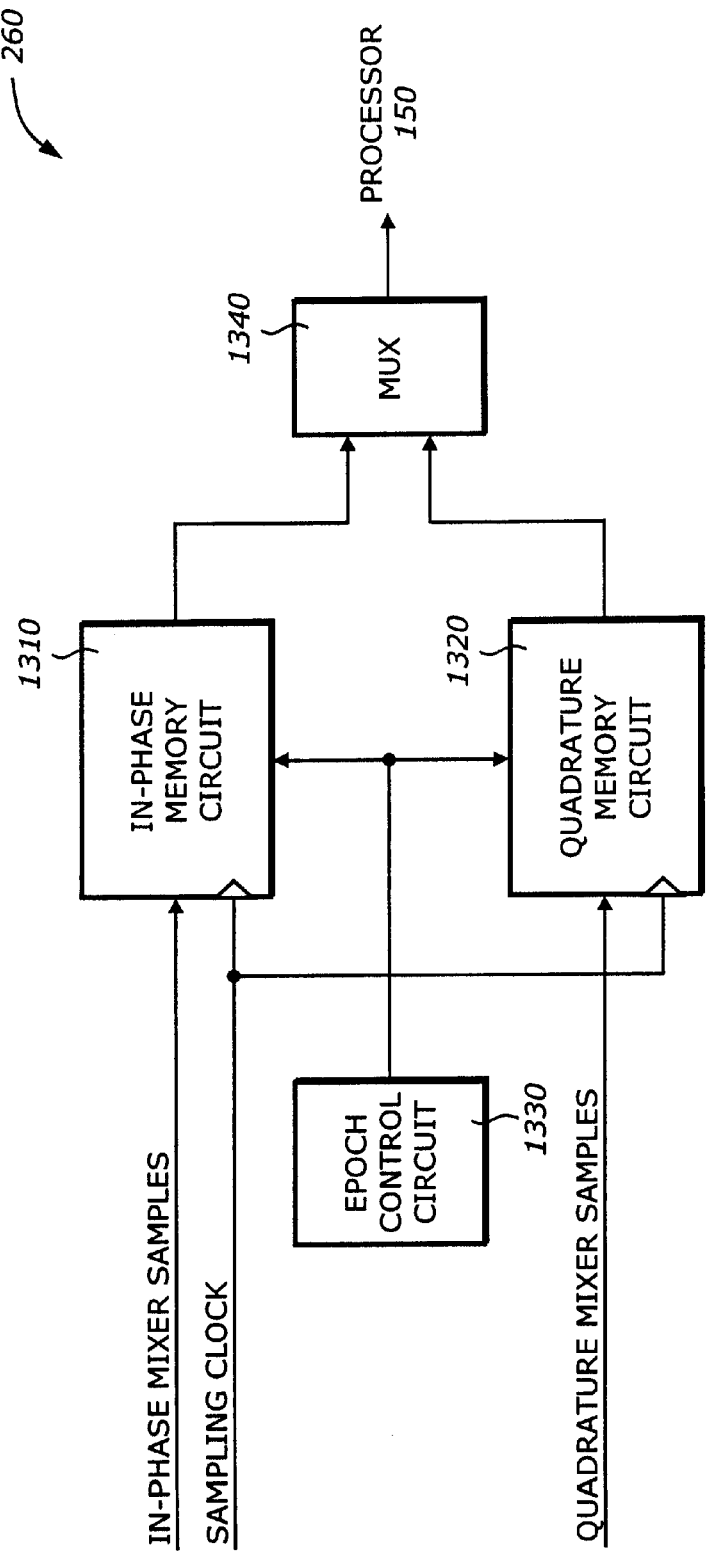
FIG. 13 is a diagram illustrating an epoch processing circuit shown in FIG. 2, which controls the I and Q memory circuits according to one embodiment of the invention.

FIG. 13 is a diagram illustrating the epoch processing circuit 260 shown in FIG. 2, which controls the I and d memory circuits according to one embodiment of the invention. The epoch processing circuit 260 includes in-phase and quadrature memory circuits 1310 and 1320, an epoch control circuit 1330, and a multiplexer 1340.

Each of the in-phase and quadrature memory circuits 1310 and 1320 accumulates the corresponding mixer samples over an epoch interval. The in-phase and quadrature memory circuits 1310 and 1320 are essentially identical except that the input for the in-phase memory circuit 1310 is the mixer in-phase sample and the input to the quadrature memory circuit 1320 is the mixer quadrature sample. The epoch control circuit 1330 generates an epoch control signal to the in-phase and quadrature memory circuits 1310 and 1320 indicating an end of an epoch. The multiplexer 1340 selects one of the in-phase and quadrature memory circuits 1310 and 1320 to be read by the processor 150.

Figure 14:
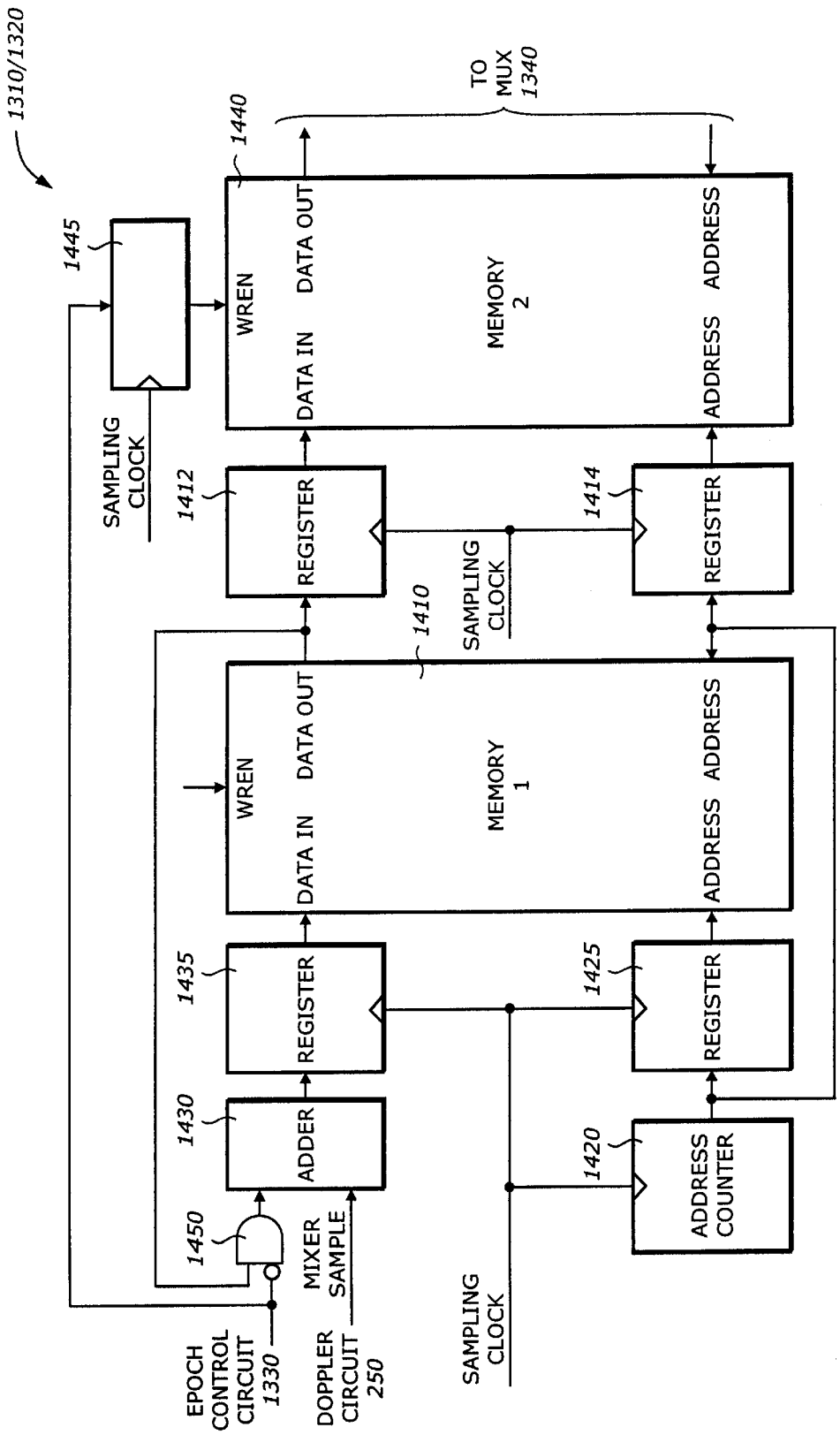
FIG. 14 is a diagram illustrating a memory circuit shown in FIG. 13 according to one embodiment of the invention.

FIG. 14 is a diagram illustrating the memory circuit 1310 shown in FIG. 13 according to one embodiment of the invention. The memory circuit 1310 includes an accumulating memory 1410, four registers 1412, 1414, 1425, and 1435, an address counter 1420, an adder 1430, a buffer memory 1440, a register 1445, and a gating circuit 1450.

The accumulating memory 1410 stores P sums of the mixer samples during an epoch interval as provided by the epoch control circuit 1330 (FIG. 13). The mixer samples arrive at the accumulating memory 1410 at the sampling clock frequency of 24*$f_0$, or every 40.72 nsec for a nominal frequency $f_0$ of 1.023 MHz. Each block of mixer samples includes the complex mixing of the 22-phase block of the input samples and the 22-phase block of the PN code samples. For the entire epoch interval which corresponds to 1023/11=93 blocks of 22-phase blocks of the input samples, the accumulation essentially adds the 22-phase result blocks for 93 times. The value of the mixer samples has a range of {−88, +88}. The range of the epoch result is therefore equal to +/−88×93=+/−8184. This range requires a word size of 14 bits including the sign bit. Each epoch also involves 12 satellite channels. To accumulate 22-blocks for all 12 channels, the total number of epoch values stored in the accumulating memory 1410 is 264. The accumulating memory 1410 is therefore organized as 512×16 to accommodate 264×14 epoch results. In one embodiment, the accumulating memory 1410 is implemented as a dual-ported memory to allow simultaneous read and write. This allows reading the partial sum from the accumulating memory 1410 and writing the partial sum to the accumulating memory 1410 at the same address at the same time.

The address counter 1420 generates an address to the accumulating memory 1410 and the buffer memory 1440. The address counter 1420 is clocked by the sampling clock signal of 24*$f_0$ frequency. The address counter 1420 sequences through the 12 satellite channels and the 22 phases. Therefore, the address counter 1420 generates the address modulo 12×22=264.

The adder 1430 adds a mixer sample to the sum stored in the accumulating memory 1410. The result of the adder 1430 is written to the accumulating memory 1430. This result is read out in the next cycle to continue accumulating the mixer samples over the epoch interval.

The buffer memory 1440 stores the P sums transferred from the accumulating memory 1410 at the end of each epoch interval. The contents of the buffer memory 1440 are read by the processor 150 via the multiplexer 1340. In one embodiment, the buffer memory 1440 is a dual-ported memory to allow simultaneous writing and reading.

The registers 1412, 1414, 1425 and 1435 are clocked by the sampling clock signal at 24*$f_0$ frequency to synchronize the latching of the address and data for the accumulating and buffer memories 1410 and 1440.

The register 1445 synchronizes the epoch control signal with the sampling clock signal at 24*$f_0$ frequency. The gating circuit 1450 gates the partial sum from the accumulating memory 1410 with the epoch control signal so that when the accumulating memory 1410 is in the write mode, the buffer memory 1440 is available for read and vice versa.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
   a gating circuit to gate an input sample with a first clock, the input sample being clocked by a sampling clock N times faster than the first clock, N being a positive integer;
   a demultiplexer coupled to the gating circuit to demultiplex the gated input sample to generate in-phase and quadrature samples; and
   an integrator coupled to the demultiplexer to integrate the in-phase and quadrature samples to generate in-phase and quadrature decimated samples corresponding to the in-phase and quadrature samples, respectively, each of the in-phase and quadrature decimated samples having K bits, K being a positive integer.

2. The apparatus of claim 1 further comprising:
   a mapper coupled to the integrator to map the in-phase and quadrature decimated samples into in-phase and quadrature demodulated samples, respectively, the in-phase and quadrature demodulated samples having L bits, L being less than K, L being a positive integer.

3. The apparatus of claim 2 wherein the gating circuit comprises:
   a frequency divider to divide the sampling clock by N to generate the first clock; and
   an exclusive OR gate coupled to the frequency divider to perform an exclusive OR operation on the input sample and the first clock, the exclusive ORed input sample and the first clock corresponding to the gated input sample.

4. The apparatus of claim 2 wherein the demultiplexer comprises:
   a first synchronizer coupled to the gating circuit to synchronize the gated input sample with a second clock, the second clock being N/2 times faster than the first clock, the first synchronizer generating the in-phase sample; and
   a second synchronizer coupled to the gating circuit to synchronize the gated input sample with a third clock, the third clock being complementary to the second clock, the second synchronizer generating the quadrature sample.

5. The apparatus of claim 4 wherein the integrator comprises:
   a first counter coupled to the first synchronizer to count first logic levels in the in-phase sample in a first integration interval, the counted first logic levels corresponding to the in-phase decimated sample; and
   a second counter coupled to the second synchronizer to count first logic levels in the quadrature sample in a second integration interval, the counted first logic levels corresponding to the in-phase decimated sample.

6. The apparatus of claim 5 wherein the first and second integration intervals are equal.

7. The apparatus of claim 6 wherein the first and second counters are clocked by one of the second and third clocks.

8. The apparatus of claim 5 wherein the mapper comprises:
   a first combinational circuit coupled to the first counter to convert the K-bit in-phase decimated sample into the L-bit in-phase demodulated sample; and
   a second combinational circuit coupled to the second counter to convert the K-bit quadrature decimated sample into the L-bit quadrature demodulated sample.

9. The apparatus of claim 8 wherein the input sample is one-bit.

10. The apparatus of claim 9 wherein K=3 and L=2.

11. A method comprising:
    gating an input sample with a first clock, the input sample being clocked by a sampling clock N times faster than the first clock, N being a positive integer;
    demultiplexing the gated input sample to generate in-phase and quadrature samples; and
    integrating the in-phase and quadrature samples to generate in-phase and quadrature decimated samples corresponding to the in-phase and quadrature samples, respectively, each of the in-phase and quadrature decimated samples having K bits, K bits being a positive integer.

12. The method of claim 11 further comprising:
    mapping the in-phase and quadrature decimated samples into in-phase and quadrature demodulated samples, respectively, the in-phase and quadrature demodulated samples having L bits, L being less than K, L being a positive integer.

13. The method of claim 12 wherein gating the input sample comprises:
    dividing the sampling clock by N to generate the first clock; and
    performing an exclusive OR operation on the input sample and the first clock, the exclusive ORed input sample and the first clock corresponding to the gated input sample.

14. The method of claim 12 wherein demultiplexing the gated input sample comprises:
    synchronizing the gated input sample with a second clock, the second clock being N/2 times faster than the first clock, the first synchronizer generating the in-phase sample; and
    synchronizing the gated input sample with a third clock, the third clock being complementary to the second clock, the second synchronizer generating the quadrature sample.

15. The method of claim 14 wherein integrating the in-phase and quadrature samples comprises:
    counting first logic levels in the in-phase sample in a first integration interval, the counted first logic levels corresponding to the in-phase decimated sample; and
    counting first logic levels in the quadrature sample in a second integration interval, the counted first logic levels corresponding to the in-phase decimated sample.

16. The method of claim 15 wherein the first and second integration intervals are equal.

17. The method of claim 16 wherein the first and second counters are clocked by one of the second and third clocks.

18. The method of claim 15 wherein mapping comprises:
converting the K-bit in-phase decimated sample into the L-bit in-phase demodulated sample by a first combinational circuit; and
converting the K-bit quadrature decimated sample into the L-bit quadrature demodulated sample a second combinational circuit.

19. The method of claim 18 wherein the input sample is one-bit.

20. The method of claim 19 wherein K=3 and L=2.

21. A receiver comprising:
a radio frequency (RF) front end circuit to receive an RF signal from a global positioning system (GPS) satellite, the RF front end circuit sampling the RF signal at a sampling clock to provide an input sample; and
a demodulator coupled to the RF front end circuit to demodulate the received RF signal, the demodulator comprising:
a gating circuit to gate the input sample with a first clock, the sampling clock being N times faster than the first clock, N being a positive integer,
a demultiplexer coupled to the gating circuit to demultiplex the gated input sample to generate in-phase and quadrature samples; and
an integrator coupled to the demultiplexer to integrate the in-phase and quadrature samples to generate in-phase and quadrature decimated samples corresponding to the in-phase and quadrature samples, respectively, each of the in-phase and quadrature decimated samples having K bits, K being a positive integer.

22. The receiver of claim 21 wherein the demodulator further comprising:
a mapper coupled to the integrator to map the in-phase and quadrature decimated samples into in-phase and quadrature demodulated samples, respectively, the in-phase and quadrature demodulated samples having L bits, L being less than K, L being a positive integer.

23. The receiver of claim 22 wherein the gating circuit comprises:
a frequency divider to divide the sampling clock by N to generate the first clock; and
an exclusive OR gate coupled to the frequency divider to perform an exclusive OR operation on the input sample and the first clock, the exclusive ORed input sample and the first clock corresponding to the gated input sample.

24. The receiver of claim 22 wherein the demultiplexer comprises:
a first synchronizer coupled to the gating circuit to synchronize the gated input sample with a second clock, the second clock being N/2 times faster than the first clock, the first synchronizer generating the in-phase sample; and
a second synchronizer coupled to the gating circuit to synchronize the gated input sample with a third clock, the third clock being complementary to the second clock, the second synchronizer generating the quadrature sample.

25. The receiver of claim 24 wherein the integrator comprises:
a first counter coupled to the first synchronizer to count first logic levels in the in-phase sample in a first integration interval, the counted first logic levels corresponding to the in-phase decimated sample; and
a second counter coupled to the second synchronizer to count first logic levels in the quadrature sample in a second integration interval, the counted first logic levels corresponding to the in-phase decimated sample.

26. The receiver of claim 25 wherein the first and second integration intervals are equal.

27. The receiver of claim 26 wherein the first and second counters are clocked by one of the second and third clocks.

28. The receiver of claim 25 wherein the mapper comprises:
a first combinational circuit coupled to the first counter to convert the K-bit in-phase decimated sample into the L-bit in-phase demodulated sample; and
a second combinational circuit coupled to the second counter to convert the K-bit quadrature decimated sample into the L-bit quadrature demodulated sample.

29. The receiver of claim 28 wherein the input sample is one-bit.

30. The receiver of claim 29 wherein K=3 and L=2.

* * * * *

UNITED STATES PATENT AND TRADEMARK OFFICE
CERTIFICATE OF CORRECTION

PATENT NO. : 6,839,389 B2
DATED : January 4, 2005
INVENTOR(S) : Alireza Mehrnia et al.

It is certified that error appears in the above-identified patent and that said Letters Patent is hereby corrected as shown below:

Column 1,
Line 4, please insert
-- STATEMENT OF GOVERNMENT INTEREST
This invention was made with Government support under Contract DAAH01-98-C-R142 awarded by the U.S. Army Aviation and Missile Command. The Government has certain rights in the invention. --

Column 2,
Line 45, please delete "having" and insert -- has --.

Column 4,
Line 18, after "shifted in" please insert -- , --.
Line 60, after "memory while" please insert -- reading out --.
Line 61, please delete "is read out"

Column 5,
Line 37, after "one is" please insert -- in --.
Line 48, please delete "form" and insert -- forms --.
Line 57, please delete "bring" and insert -- brings --.

Column 7,
Line 22, please delete "shift" and insert -- shifting --.

Column 8,
Line 37, please delete "left most" and insert -- leftmost --.

Column 9,
Line 3, please delete "produce" and insert -- produces --.

Column 10,
Lines 8 and 19, please delete "perform" and insert -- performs --.

UNITED STATES PATENT AND TRADEMARK OFFICE
CERTIFICATE OF CORRECTION

PATENT NO. : 6,839,389 B2
DATED : January 4, 2005
INVENTOR(S) : Alireza Mehrnia et al.

It is certified that error appears in the above-identified patent and that said Letters Patent is hereby corrected as shown below:

Column 14,
Line 2, please delete "d" and insert -- Q --.

Signed and Sealed this

Thirty-first Day of May, 2005

JON W. DUDAS
*Director of the United States Patent and Trademark Office*